US011176931B2

(12) United States Patent
Schlesinger et al.

(10) Patent No.: US 11,176,931 B2
(45) Date of Patent: Nov. 16, 2021

(54) CONVERSATIONAL BOOKMARKS

(71) Applicant: Microsoft Technology Licensing, LLC, Redmond, WA (US)

(72) Inventors: Benny Schlesinger, Ramat Hasharon (IL); Keren Damari, Tel Aviv (IL); Avichai Cohen, Givat Shmuel (IL); Yuval Pinchas Borsutsky, Rishon LeZion (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 327 days.

(21) Appl. No.: 15/275,027

(22) Filed: Sep. 23, 2016

(65) Prior Publication Data
US 2018/0090135 A1    Mar. 29, 2018

(51) Int. Cl.
*G10L 15/22* (2006.01)
*H04L 12/58* (2006.01)
*G10L 15/16* (2006.01)
*G10L 13/00* (2006.01)

(52) U.S. Cl.
CPC .............. *G10L 15/22* (2013.01); *H04L 51/16* (2013.01); *G10L 13/00* (2013.01); *G10L 15/16* (2013.01)

(58) Field of Classification Search
None
See application file for complete search history.

(56) References Cited

U.S. PATENT DOCUMENTS

| 8,533,199 B2 | 9/2013 | Malla |
| 2002/0052913 A1 | 5/2002 | Yamada et al. |
| 2007/0154190 A1* | 7/2007 | Gilley ............... G11B 27/034 386/241 |
| 2008/0243517 A1* | 10/2008 | Muschett ............ G10L 15/22 704/275 |
| 2010/0324908 A1 | 12/2010 | Rosser et al. |

(Continued)

FOREIGN PATENT DOCUMENTS

WO    2015089016 A1    6/2015

OTHER PUBLICATIONS

Waseem Abbas, How to Customize Permalinks in WordPress; Date: Aug. 1, 2016; p. all URL: https://enviragallery.com/how-to-customize-permalinks-in-wordpress/ (Year: 2016).*

(Continued)

*Primary Examiner* — Richa Mishra
(74) *Attorney, Agent, or Firm* — Alleman Hall Creasman & Tuttle LLP

(57) ABSTRACT

A computer-implemented technique is described for enabling a user to create a conversational bookmark in the course of the user's interaction with a BOT. The bookmark designates a particular juncture in the user's interaction with the BOT. When the user later invokes the bookmark, the computer-implemented technique resumes the user's interaction with the BOT, starting at the particular juncture. The technique can accomplish the above functions in a BOT-independent manner (which does not involve changes to the BOT) or a BOT-dependent manner (which involves changes to the BOT). The technique can also be extended to a task of creating and activating bookmarks in the course of a conversation among two or more humans.

19 Claims, 16 Drawing Sheets

(56) References Cited

U.S. PATENT DOCUMENTS

| | | | |
|---|---|---|---|
| 2011/0219055 A1* | 9/2011 | Bailey | G06F 15/16 |
| | | | 709/202 |
| 2013/0077772 A1* | 3/2013 | Lichorowic | H04M 1/271 |
| | | | 379/88.02 |
| 2014/0122083 A1 | 5/2014 | Xiaojiang | |
| 2014/0279050 A1 | 9/2014 | Makar et al. | |
| 2015/0066479 A1 | 3/2015 | Pasupalak et al. | |
| 2015/0161651 A1 | 6/2015 | Rodriguez et al. | |
| 2016/0308999 A1* | 10/2016 | Bonmassar | H04L 67/327 |
| 2017/0180276 A1* | 6/2017 | Gershony | H04L 51/20 |
| 2017/0250935 A1* | 8/2017 | Rosenberg | H04L 51/02 |
| 2017/0293834 A1* | 10/2017 | Raison | G06N 3/006 |

OTHER PUBLICATIONS

Blandin Williy, Techniques to Respond to User Requests Using Natural-Language Machine Learning Based on Example Conversations; Date: Apr. 11, 2016; pp. All (Year: 2016).*

Waseem Abbas, How to Customize Permalinks in WordPress; Date: Aug. 1, 2016; p. all URL: https://enviragallery.com/how-to-customize-permalinks-in-wordpress/ (Year: 2016).*

"Microsoft Bot Framework," available at <<https://dev.botframework.com/>>, Microsoft Corporation, Redmond, WA, retrieved on Jul. 8, 2016, 5 pages.

"Tracking your bot's conversations," available at <<http://blog.pandorabots.com/tracking-your-bots-conversations/>>, Pandorabots, published on Nov. 14, 2014, 4 pages.

Aimless, Doubly, "A Tutorial for Adding Knowledge to Your Robot," available at <<https://www.pandorabots.com/botmaster/en/tutorial>>, Pandorabots, published on May 2004, 24 pages.

Britz, Denny, "Deep Learning for Chatbots, Part 1—Introduction," available at <<http://www.wildml.com/2016/04/deep-learning-for-chatbots-part-1-introduction/>>, WildML, published on Apr. 6, 2016, 9 pages.

Cervantes, et al., "Google and Ray Kurzweil Making Chatbots That Will Allow for Interesting Conversations," available at <<http://www.androidauthority.com/google-ray-kurzweil-chatbots-695472/>>. Android Authority, published on May 28, 2016, 5 pages.

Mittal, et al., "A Comparative Study of Chatbots and Humans," in International Journal of Advanced Research in Computer and Communication Engineering, vol. 5, Issue 3, Mar. 2016, 3 pages.

* cited by examiner

← 1502

BOT-AGNOSTIC ILLUSTRATIVE BOOKMARK CONTENTS:
- METADATA VALUES (E.G., USER, BOT, VERSION, TIME, ETC.
- ITEMS USED TO PROVIDE A VISUAL REPRESENTATION OF THE BOOKMARK
- SEQUENCE OF USER MESSAGES
- OPTIONALLY, SEQUENCE OF BOT (OR OTHER USER) MESSAGES
- OPTIONALLY, ANY USER SUPPLIED CONTENT ITEMS (IMAGES, ETC.)
- ETC.

(FOR EXAMPLE)

BOOKMARK1
- USER: GEORGE
- BOT: RESTAURANT BOT
- VERSION: 3.0
- TIME: 3/15/16, 3:23PM
- DISPLAYED DESCRIPTION: BOOKMARK1, "RESTAURANT SUGGESTIONS"
- USER MESSAGES: (1) LUNCH RESERVATION, (2) YES, (3) TODAY, (4) ITALIAN
- CONTENT ITEMS: NONE

BOT-SPECIFIC ILLUSTRATIVE BOOKMARK CONTENTS:
- METADATA VALUES (E.G., USER, BOT, VERSION, TIME, ETC.)
- ITEMS USED TO PROVIDE A VISUAL REPRESENTATION OF THE BOOKMARK
- BOT-SPECIFIC SERIALIZED STATE, INCLUDING ANY OF:
  - USER MESSAGES
  - BOT MESSAGES
  - BOT-DERIVED DIALOG FEATURES, E.G., SLOT VALUES (ANSWERS)
- OPTIONALLY, ANY USER SUPPLIED CONTENT ITEMS (IMAGES, ETC.)
- ETC.

FIG. 16

CONVERSATIONAL BOOKMARKS

BACKGROUND

Online services are increasingly making uses of BOTs. A BOT refers to a computer-implemented agent that interacts with a user in a conversational manner. For instance, one type of BOT may assist a user in making a hotel reservation. Another type of BOT may guide the user in preparing a form. In each such case, the BOT, if well designed, will give the user the impression that he or she is interacting with an actual human being, instead of an automated agent.

In conventional practice, a user may invoke a session with a BOT by making an introductory utterance, or by responding to an introductory utterance issued by the BOT. For instance, the user who seeks to make a reservation may activate a reservation-related BOT and issue the command, "Make a new reservation." The user will then engage in a multi-turn dialog with the BOT until the reservation is successfully set up or the reservation task is abandoned by the user. The user repeats this same series of steps when a need arises to make another reservation; on each such occasion, the user advances through a complete dialog, beginning, on each such occasion, afresh at the first turn of the dialog.

SUMMARY

A computer-implemented technique is described for enabling a user to create a conversational bookmark in the course of the user's interaction with an automated agent (referred to herein as a BOT). The bookmark designates a particular juncture in the user's interaction with the BOT. When the user later invokes the bookmark, the computer-implemented technique resumes the user's interaction with the BOT, starting at the particular juncture.

According to one illustrative aspect, the technique accomplishes the generating and activation of bookmarks in a manner that is independent of the automated agent. This aspect enables the technique to work in conjunction with many different BOTs, regardless of the particular configurations of the BOTs. But in other implementations, the technique involves changes to the operation of the BOT, at least to some extent.

According to another illustrative aspect, the technique provides a bookmarking service for use in conjunction with an interaction between two or more human users, instead of, or in addition to, a dialog between the user and a BOT.

According to another illustrative aspect, the technique enables a user to share a conversational bookmark that he or she has created with one or more additional users. A recipient user may invoke the bookmark to resume a dialog, starting from the particular juncture identified by the bookmark.

The above technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 15 shows one implementation of a BOT-independent bookmark.

FIG. 16 shows one implementation of a BOT-dependent bookmark.

Figure 1:
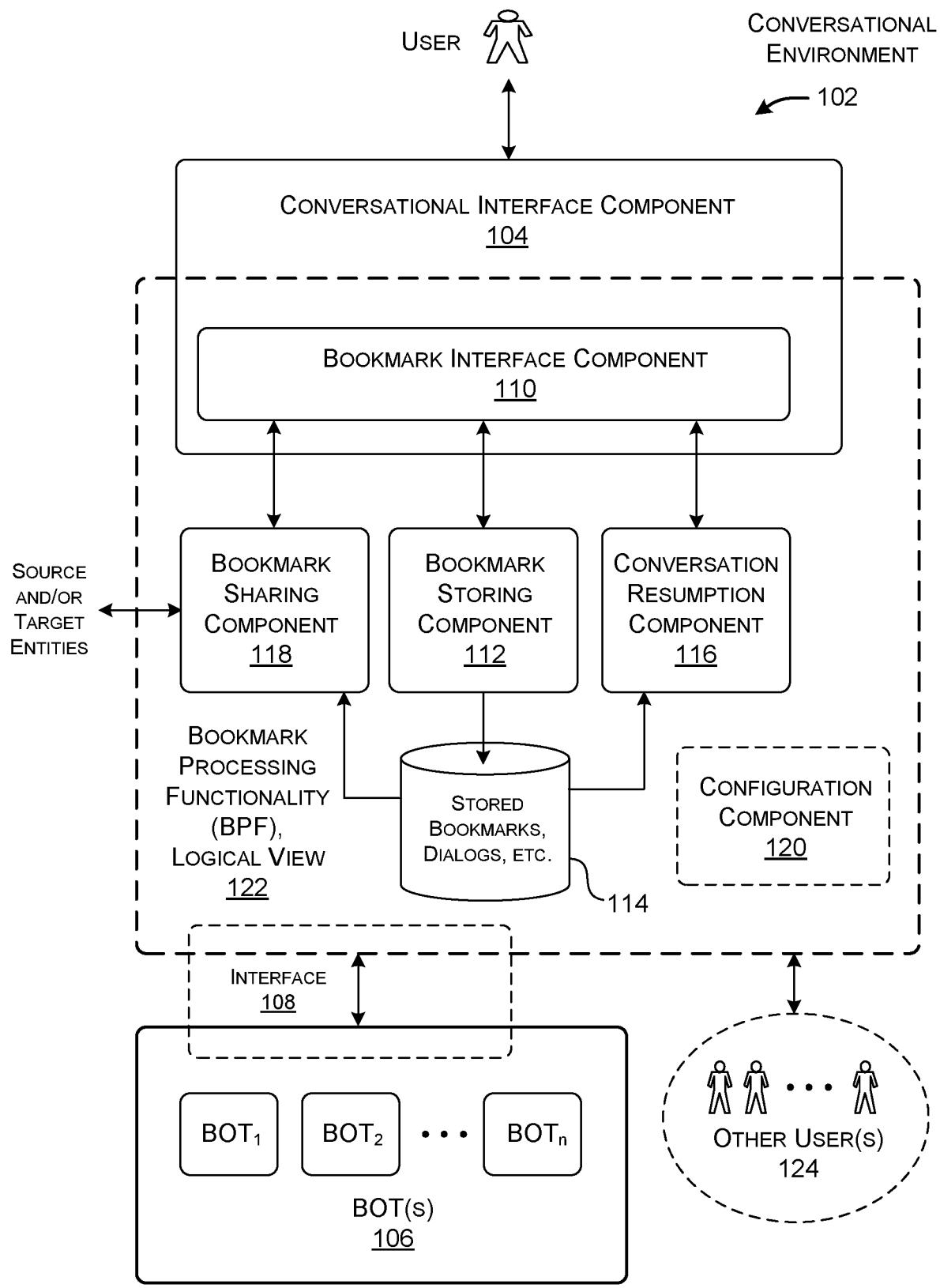
FIG. 1 shows a logical overview of an environment for providing a conversational bookmarking service. The environment allows a user to create bookmarks in the course of a conversation with a human or automated agent (a "BOT"), and then later activate those bookmarks to return to specific junctures of the conversation.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computer-implemented system for creating and invoking conversational bookmarks. Section B sets forth illustrative methods which explain the operation of the system of Section A. And Section C describes illustrative computing functionality that can be used to implement any aspect of the features described in Sections A and B.

As a preliminary matter, some of the figures describe concepts in the context of one or more structural components, also referred to as functionality, modules, features, elements, etc. In one implementation, the various components shown in the figures can be implemented by software running on computer equipment, or other logic hardware (e.g., FPGAs), etc., or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. Section C provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts can be implemented by software running on computer equipment, other logic hardware (e.g., FPGAs), etc., or any combination thereof.

As to terminology, the phrase "configured to" encompasses various physical and tangible mechanisms for performing an identified operation. The mechanisms can be configured to perform an operation using, for instance, software running on computer equipment, other logic hardware (e.g., FPGAs), etc., or any combination thereof.

The term "logic" encompasses various physical and tangible mechanisms for performing a task. For instance, each operation illustrated in the flowcharts corresponds to a logic component for performing that operation. An operation can be performed using, for instance, software running on computer equipment, other logic hardware (e.g., FPGAs), etc., or any combination thereof. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific terms "computer-readable storage medium" and "computer-readable storage medium device" expressly exclude propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative System

A.1. Overview

FIG. 1 shows a logical overview of an environment 102 for providing a bookmarking service. The environment 102 allows users to create bookmarks in the course of a conversation with a human or automated agent (referred to herein as a BOT or ChatBOT), and then later activate those bookmarks to return to specific junctures of the conversation. To facilitate and simplify the description, however, the examples to follow will mostly emphasize the case in which a user carries out a conversation with a BOT.

To begin with, a conversational interface component 104 provides a mechanism by which a user may interact with one or more BOTs 106. In one implementation, the conversation interface component 104 corresponds to a front end of a messaging application. As will be described in the context of FIG. 9 (below), the messaging application may run on a local computing device and/or on a remote server computing device.

In operation, the conversational interface component 104 provides a user interface presentation for receiving a message from the user. The user supplies the message (also referred to as an utterance herein) using any input device. The backend of the messaging application then transfers the message to a selected BOT and receives the BOT's response to the message. The conversational interface component 104 then presents the response on the user interface presentation. In the examples presented below, the conversational interface component 104 performs the above interaction with the user via one or more graphical user interface presentations. But in other implementations, the conversational interface component 104 can communicate with the user via other modes, such as an audio mode, haptic mode, etc., or combination thereof.

An interface 108 handles interaction between the conversational interface component 104 and the BOTs 106. In one implementation, the interface 108 can include functionality which formulates messages generated by the conversational interface component 104 as Uniform Resource Locators (URLs). That is, each URL can identify the address of a particular BOT with which the user is interacting, and also include the content of a message (and may also contain one or more metadata values). The interface 108 may receive messages from the BOT which are formulated in the same manner, with the exception that the messages from the BOT will specify the address of the conversational interface component 104. In other implementations, the interface 108 can be implemented using alternative technology, such as an Application Programming Interface (API) that does not formulate messages as URLs.

A bookmark interface component 110 handles the user's interaction with bookmarks. For instance, the bookmark interface component 110 includes one or more user interface presentations that allow a user to create a bookmark, invoke a previously stored bookmark, edit a bookmark, share a bookmark with another user, and so. Later figures provide examples of graphical user interface presentations for performing these bookmark-related functions. In an alternative audio mode of interaction, the bookmark interface component 110 can operate by receiving a user's vocalized command to create a bookmark or invoke a previously created bookmark. The bookmark interface component 110 can be implemented as a component of the conversational interface component 104, or as a separate component which interacts and integrates with the conversational interface component 104.

A bookmark storing component 112 provides a backend service that stores the user's bookmarks in one or more data stores 114. For instance, the bookmark storing component 112 can store the bookmarks associated with each user in a user profile associated with that user. In addition, the bookmark storing component 112 can optionally store a complete or partial transcript of each dialog between the user and a BOT. The transcript, for instance, can list a sequence of messages exchanged by the user and the BOT. The transcript can also include indicators which show the location(s) of any bookmark(s) within the dialog.

Each bookmark that is created designates a particular juncture in a dialog. For instance, in one implementation, a bookmark can be defined with reference to whatever message immediately precedes it or follows it (or both). The preceding or following message may correspond to a user message or a BOT message. In addition, or alternatively, the bookmark can be defined with reference to a particular time in the course of the dialog, measured from the start of the dialog.

In one implementation, the bookmark storing component 112 can formulate each bookmark as a URL that includes multiple information items that collectively define the bookmark. In one implementation, the URL assigns meaningful labels to the information item in the URL, which allows a user to understand and edit the URL. In another implementation, the bookmark storing component 112 can formulate each bookmark as a URL that includes a reference to separately stored information items. Still other implementations can formulate a bookmark in other ways, such as a file, etc. FIGS. 15 and 16, to be described below, show two examples of bookmarks produced by the bookmark storing component 112.

A conversation resumption component 116 provides a backend service that allows the user to invoke a particular bookmark in the data store(s) 114. In response to invoking the bookmark, the conversation resumption component 116 resumes a previous dialog at a particular juncture in the dialog designated by the bookmark.

A bookmark sharing component 118 provides a backend service that allows a user to share a bookmark with one or more other users. For instance, the bookmark sharing component 118 can allow a user to share a bookmark with a friend, fellow student, work colleague, family member, etc. The recipient of the bookmark can invoke the bookmark to resume a dialog at a particular juncture identified by the bookmark. As such, this functionality provides a way for a first user to conduct a first part of a dialog, and a second user to conduct a second part of the dialog. In one use scenario, for instance, a man may advance through a complex dialog to a desired location, and then pass a bookmark to his elderly mother; the bookmark will allow the mother to complete the dialog starting from the location cued up by her son.

A configuration component 120 provides a mechanism by which a user can configure any aspect of the bookmark storing component 112, the conversation resumption component 116, and/or the bookmark sharing component 118. For example, the user may invoke the configuration component 120 to specify his or her preference as to the manner in which the bookmark storing component 112 stores bookmarks and dialogs.

Overall, FIG. 1 designates all of the above-described features that entail the processing of bookmarks as "bookmark processing functionality," or BPF 122. Note that FIG. 1 provides a logical depiction of the BPF 122. Subsection A.3 describes different ways that the logical functions illustrated in FIG. 1 can be allocated to different computing devices. As will be described below, an implementation need not group all of the above-described bookmark-related functions together in a single system or device, contrary to an impression that may be conveyed by FIG. 1.

Figure 10:
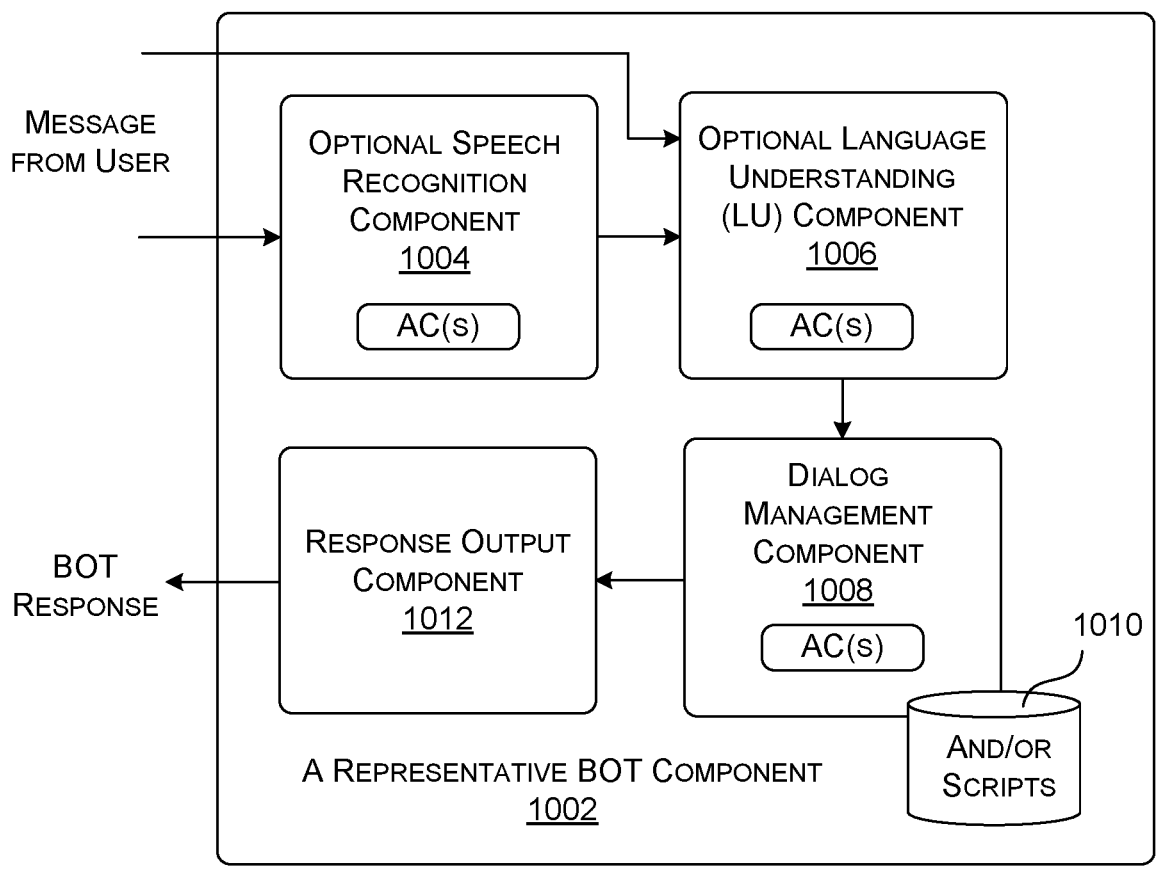
FIG. 10 shows one implementation of an automated agent for use in the system of FIG. 9.
Figure 11:
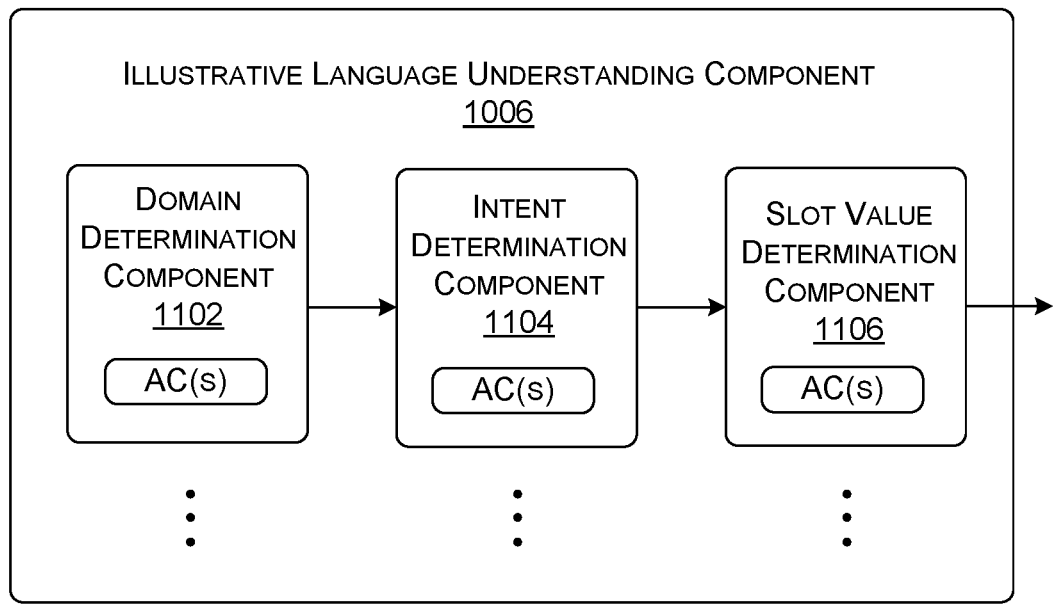
FIG. 11 shows one implementation of a language understanding component, which is a component of the automated agent of FIG. 10.

The BOTs 106 themselves can correspond to any automated agents for performing any functions in any domain(s). FIGS. 10 and 11, to be described below, show a representative and non-limiting example of one type of BOT that can be used.

As noted above, the user can also interact with one or more other users 124. In that setting, the bookmark storing component 112 can create a bookmark in a dialog among at least two human users. The conversation resumption component 116 can restore a particular juncture of the dialog when one of the users activates a corresponding bookmark. And the bookmark sharing component 118 provides a way of sharing any such bookmark with yet another user who may or may not be an original party to the dialog.

In one use scenario, for instance, a first user may discuss several issues regarding an upcoming trip with a second user. One of the users may bookmark a juncture at which one of the issues (such as the choice of lodging) is discussed, upon determining that the issue cannot be immediately resolved. The first or second user may later invoke the bookmark to continue discussion of the unresolved issue. Upon invoking the bookmark, the BPF 122 will cue up the conversation to the juncture in the conversation designated by the bookmark. The BPF 122 can also present a transcript (in visual and/or spoken form) which conveys the messages exchanged between the two users prior to the bookmark; this provides a way of reminding the users of the progress that has been made to date regarding the issue under consideration.

A.2. Illustrative User Experience

Figure 2:
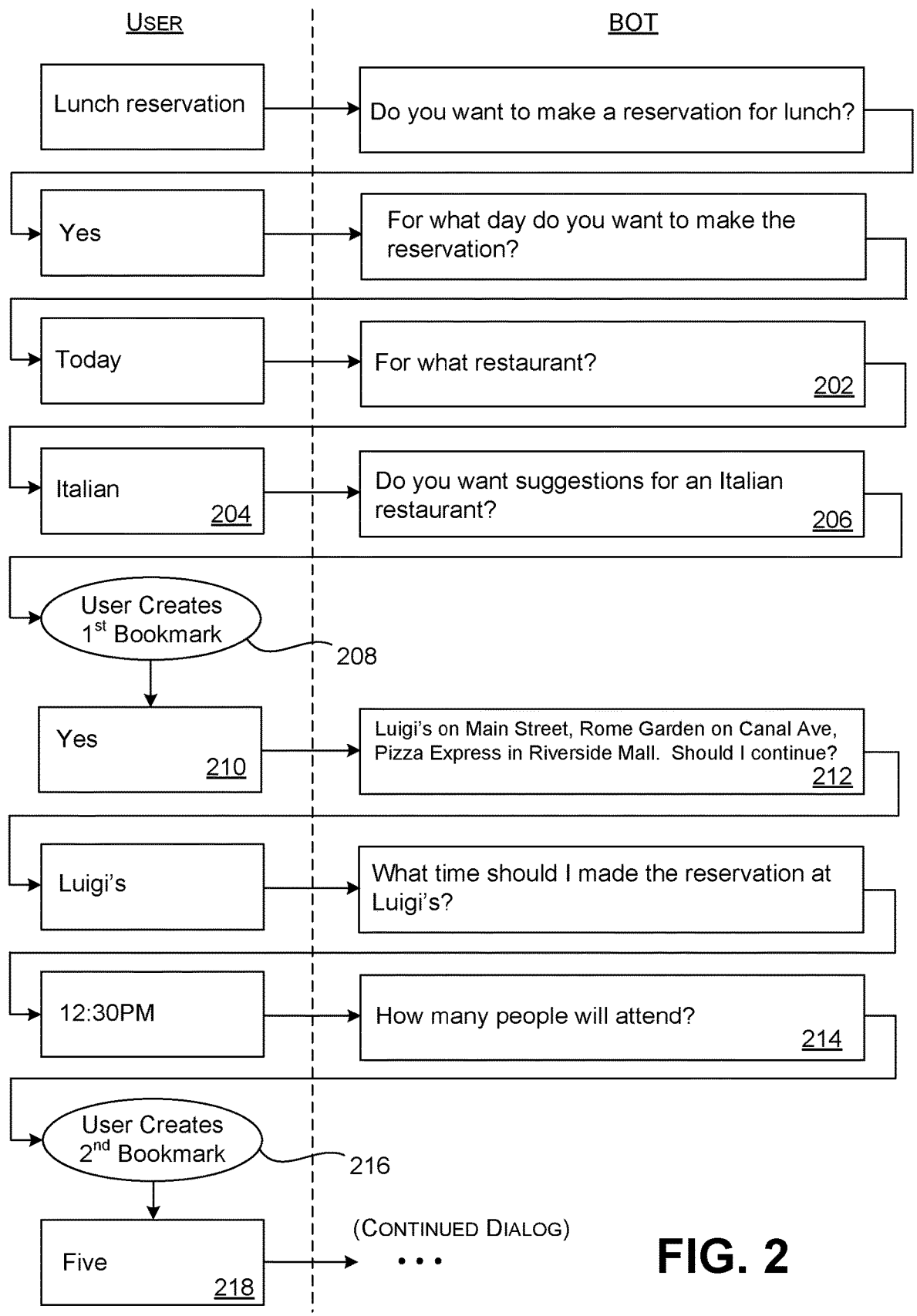
FIG. 2 shows an example in which a user creates two bookmarks in the course of interacting with a BOT.

FIG. 2 shows an example in which a user creates two bookmarks in the course of interacting with a BOT, at two respective junctures of the conversational flow. Here, assume that the BOT assists the user in making a lunch reservation. The content of the BOT's messages shown in FIG. 2 is merely illustrative.

At one juncture 202 in the dialog, the BOT asks the user the name of the restaurant for which the user will be dining. At juncture 204, the user submits the answer, "Italian," instead of specifying a particular name of a restaurant. In response, at juncture 206, the BOT asks, "Do you want suggestions for an Italian restaurant?" At juncture 208, the user creates a first bookmark (Bookmark1), and then, at juncture 210, replies, "Yes." In response to the user's reply, at juncture 212, the BOT suggests a few restaurants in the Italian genre. The user may have decided to create a bookmark preceding the delivery of the list of restaurants because the user may have foreseen the possibility that he or she may want to return to this juncture in the future, e.g., for the purpose of revising one or more choices that the user may make in the dialog after this juncture.

At a still later juncture 214 in the dialog, the BOT asks the user how many people will attend the lunch. Immediately thereafter, at juncture 216, the user creates a second bookmark (Bookmark2). Then, at juncture 218, the user responds to the BOT by saying "Five."

Figure 3:
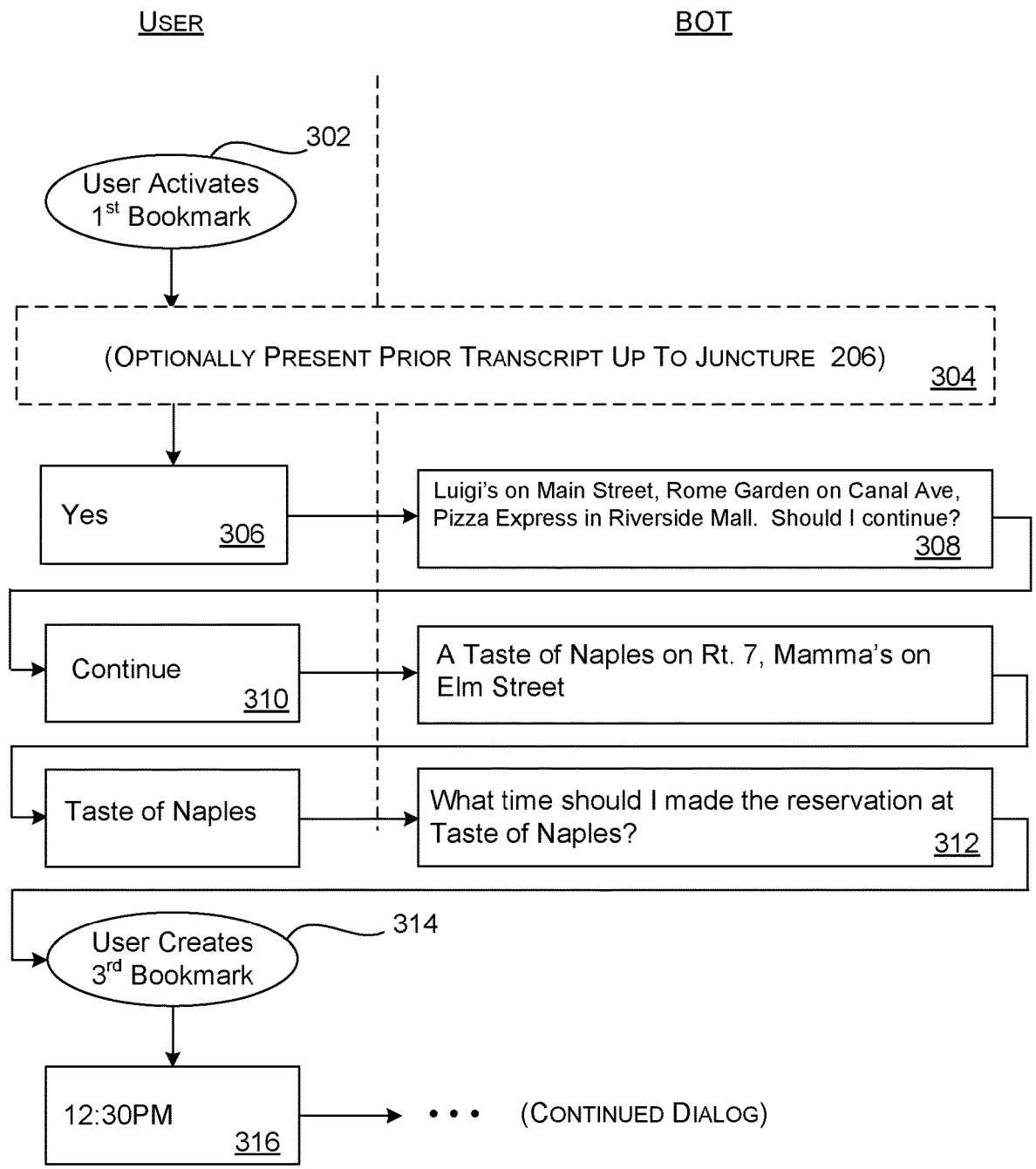
FIG. 3 shows an example in which the user activates one of the bookmarks created in the conversation of FIG. 2, enabling the user to return to a particular juncture in the conversation.

Advancing to FIG. 3, at juncture 302, the user invokes the first bookmark (Bookmark1). Recall that the first bookmark designates the juncture 208 in the dialog shown in FIG. 2. At juncture 304, the BOT resumes the previous dialog at the point associated with the juncture 208 in FIG. 2. Optionally, the BOT also displays a transcript of the messages which precede the juncture 208 as a reminder to the user of the current position in the dialog. In the case of a voice-mode user interface presentation, the BOT can optionally provide one or more utterances (in spoken form) which immediately precede the juncture 208. For instance, the BOT can repeat the question originally posed at juncture 206. At juncture 306, the user again replies "Yes" to the question posed by the BOT at juncture 206. At juncture 308, the BOT provides the same restaurant suggestions that it made at juncture 212 in FIG. 2. At juncture 310, the user now responds to the list of restaurant suggestions by saying "Continue," rather than choosing a specific name of a restaurant. Hence, although the user resumes a previous dialog, the user soon steers that dialog along a different path compared to the previous dialog.

Later, at juncture 312, the BOT asks the user to provide the time for which the reservation should be made. At juncture 312, the user creates yet another bookmark (Bookmark3). Immediately thereafter, at juncture 316, the user provides the requested reservation time. Note that the first two bookmarks are defined with respect to an original dialog flow. The third bookmark is defined with respect to a revised dialog flow which branches off from the original dialog flow.

Figure 4:
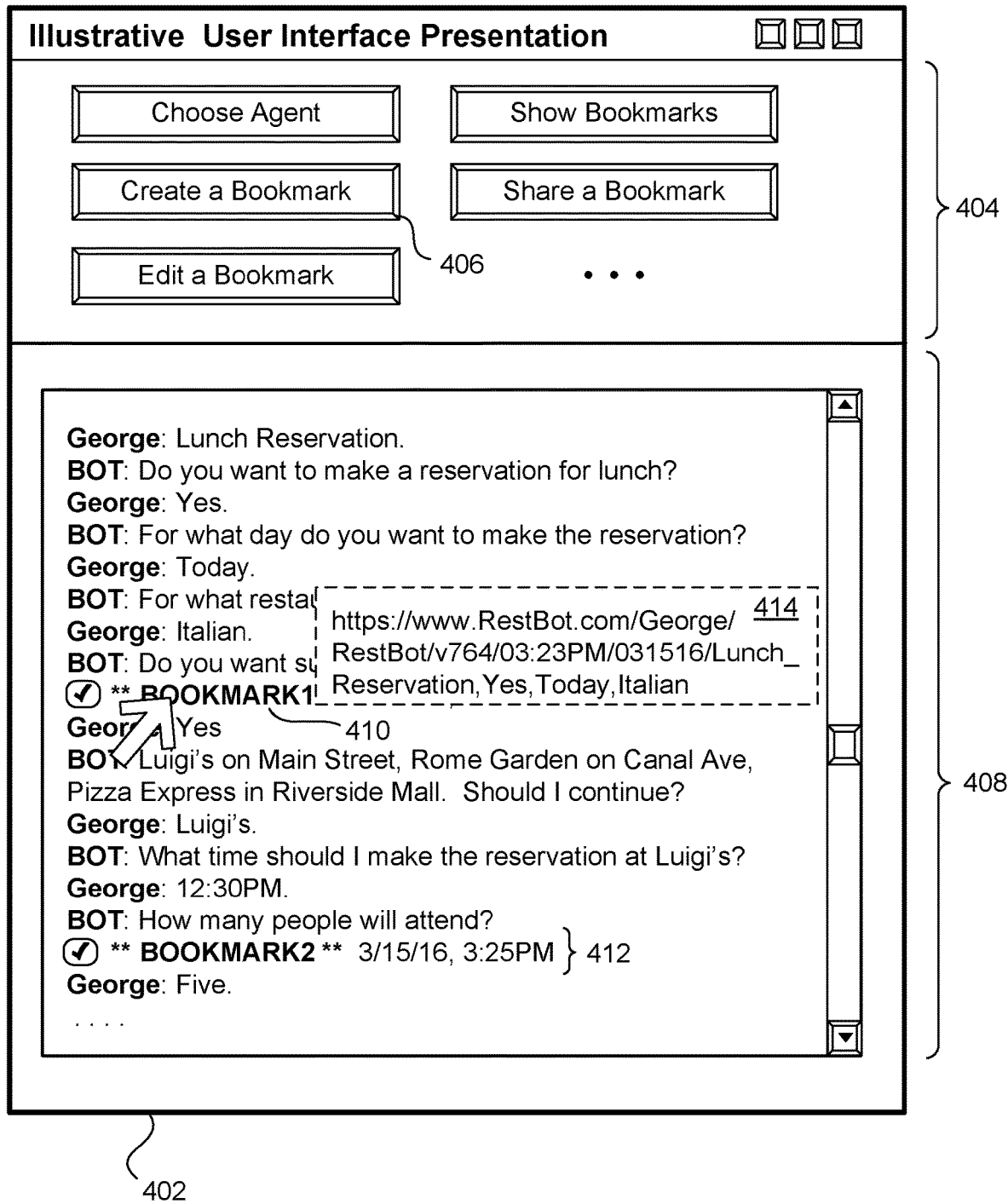
FIG. 4 shows an interactive user interface presentation that provides the bookmark-creation experience described in FIG. 2.

FIG. 4 shows an interactive user interface presentation 402 that provides the bookmark-creation experience described in FIG. 2. The bookmark interface component 110 generates the user interface presentation 402 (and all other user interface presentations described herein). The bookmark interface component 110 also handles the user's interaction with the user interface presentation 402.

In one non-limiting implementation, the user interface presentation 402 includes a first region 404 that provides a set of graphical control features. The user may invoke different operations by activating respective control features. For instance, the user may invoke a "Create a Bookmark" graphical control feature 406 to create a bookmark at a particular juncture in an ongoing dialog. The user interface presentation 402 includes a second region 408 for showing an evolving series of messages exchanged between the user and the reservation BOT.

All aspects of the user interface presentation shown in FIG. 4 (and other figures) are presented in the spirit of illustration, not limitation. For example, instead of, or in addition to, interacting with a BOT via a graphical user interface presentation (as shown in FIG. 4), a user can interact with the BOT in spoken form. Also, other implementations can use different control mechanisms for invoking different commands, compared to the mechanisms shown in FIG. 4. For instance, another implementation can use different "hot keys" provided by a physical key input device to invoke respective commands. Another implementation can use different gestures performed on a touch-sensitive screen to invoke respective commands. Another implementation can use different voice commands for activating respective commands, and so on.

Other implementations can use different approaches for recording and depicting a flow of messages in a dialog. For instance, another implementation (not shown) can use a first region that shows a most recent message provided by the BOT. The first region can provide an input field for receiving the user's response to the BOT's most recent message. That implementation can use a second region to show older messages in the exchange of messages.

In the particular example of FIG. 4, the second region provides a visual representation 410 of the first bookmark created at juncture 208 in FIG. 2 and a visual representation 412 of a second bookmark created at juncture 216 in FIG. 2. Each visual representation of a bookmark can include any fields of information. In the merely illustrative example of FIG. 4, each visual representation includes an identifier associated with the bookmark (e.g., "BOOKMARK1"), and a time and date at which the bookmark was created.

In some implementations, the bookmark interface component 110 can present the full text of any bookmark upon the user's request. For example, the bookmark interface component 110 can present a popup presentation 414 that displays the full content of the first bookmark when the user hovers over or taps on the visual representation 410 of the first bookmark. In this illustrative implementation, the first bookmark is formulated as a URL having different information items, described more fully below.

Figure 5:
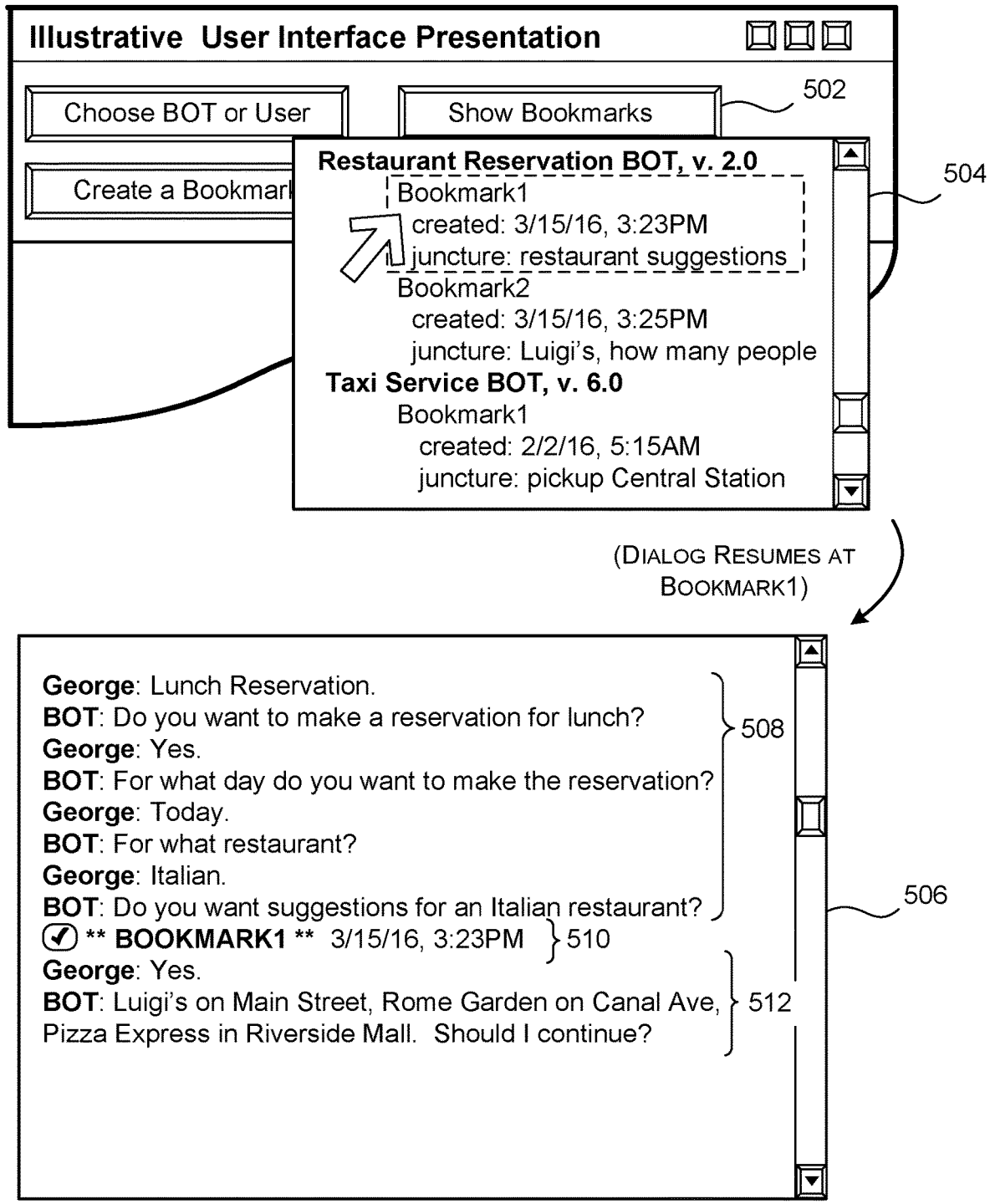
FIG. 5 shows an interactive user interface presentation that provides the bookmark activation experience described in FIG. 3.

FIG. 5 shows an interactive user interface presentation that provides the bookmark activation experience described in FIG. 3. Assume that the user initiates the experience by activating a "Show Bookmarks" graphical control feature 502. In response, the bookmark interface component 110 presents a popup panel 504 that shows a list of bookmarks that have been created. The list of bookmarks includes the first two bookmarks created in the exchange of FIG. 2. The list of bookmarks can also include any bookmarks created through interaction with other BOTs, such as, in the case of FIG. 5, a taxi service-related BOT.

Assume that the user activates Bookmark1 created in the conversation with the restaurant BOT, associated with juncture 208 in the dialog of FIG. 2. In response, the bookmark interface component 110 resumes the dialog shown in FIG. 2 at the juncture 208. More specifically, a region 506 optionally shows a first series of messages 508 exchanged between the user and the BOT, up to the juncture 208. The region 506 next shows a visual representation 510 of the Bookmark1. The user then engages the BOT by replying "Yes" to the BOT's outstanding question. Thereafter, the user can steer the conversation along the conversational path shown in FIG. 3, or in any other way.

The user may select a bookmark in the panel 504 in any manner, e.g., by clicking on a visual representation of the bookmark with a mouse device, tapping on the visual representation to activate an associated touch-sensitive control field, speaking the bookmark, etc.

The bookmark interface component 110 can use different strategies for creating a visual representation of each bookmark in the panel 504. In one approach, the bookmark interface component 110 automatically creates a bookmark that includes keywords associated with a message which immediately precedes the bookmark; that message may correspond to a user message or a BOT message. For instance, the visual representation of Bookmark1 for the restaurant BOT includes the description "restaurant suggestions," because, at the most recent juncture 206 prior to the creation of the Bookmark1, the BOT asks the user whether he or she wants restaurant suggestions. The visual representation of Bookmark2 for the restaurant BOT bears the title "Luigi's, how many people?" This is because, at the most recent juncture 214 preceding the creation of the Bookmark2, the BOT has asked the user to specify how many people will be attending a lunch at a restaurant named Luigi's. In addition, the bookmark interface component 110 can allow a user to edit any visual representation of a bookmark, e.g., to provide a new title that the user deems more informative than the title that has been assigned by default.

Figure 6:
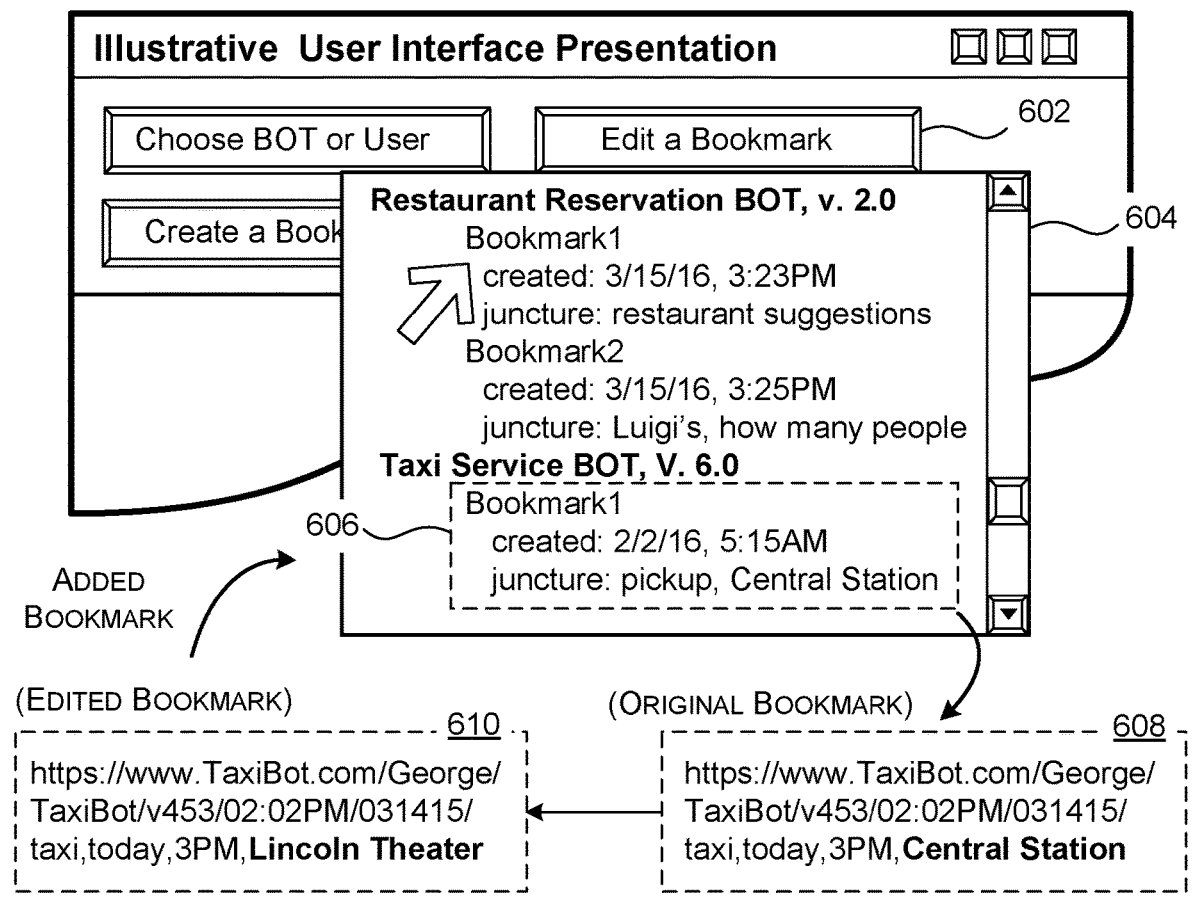
FIG. 6 shows an interactive user interface presentation that enables the user to edit a previously created bookmark.

In FIG. 6, assume that the user activates an "Edit a Bookmark" graphical control feature 602. In response, the bookmark interface component 110 presents a graphical panel 604 that shows a list of previously created bookmarks, any of which can be edited. Assume that the user activates a visual representation 606 of a bookmark created by the user in the course of interaction with a taxi service-related BOT. In particular, the bookmark specifies a pickup location that the user has previously specified, "Central Station."

In response, the bookmark interface component 110 can present a popup presentation 608 that shows the full text of the selected bookmark, here presented as a URL. The bookmark interface component 110 can then allow the user to edit the URL. In the merely illustrative case of FIG. 6, assume that the user edits the bookmark by replacing a pickup location from "Central Station" to "Lincoln Theater." The popup presentation 610 shows the edited URL.

In response to the user's edits, the bookmark storing component 112 stores the edited version of the bookmark. More specifically, depending on how configured, the bookmarking storing component 112 can store an entirely new bookmark corresponding to the edited bookmark, leaving the previous bookmark in place, or can replace the previous bookmark with the edited bookmark.

Assume that the user next activates the edited bookmark. In response, the conversation resumption component 116 will restore the conversation to the same juncture in the conversation designated by the original bookmark, with the exception that the user's immediate response will be changed to "Lincoln Theater," instead of "Central Station." The taxi service-related BOT will also take note of the change upon resumption of the dialog, which may or may not influence its subsequent interaction with the user. In other words, the user's changes to a bookmark are not merely cosmetic because they communicate new instructions to the BOT.

Figure 7:
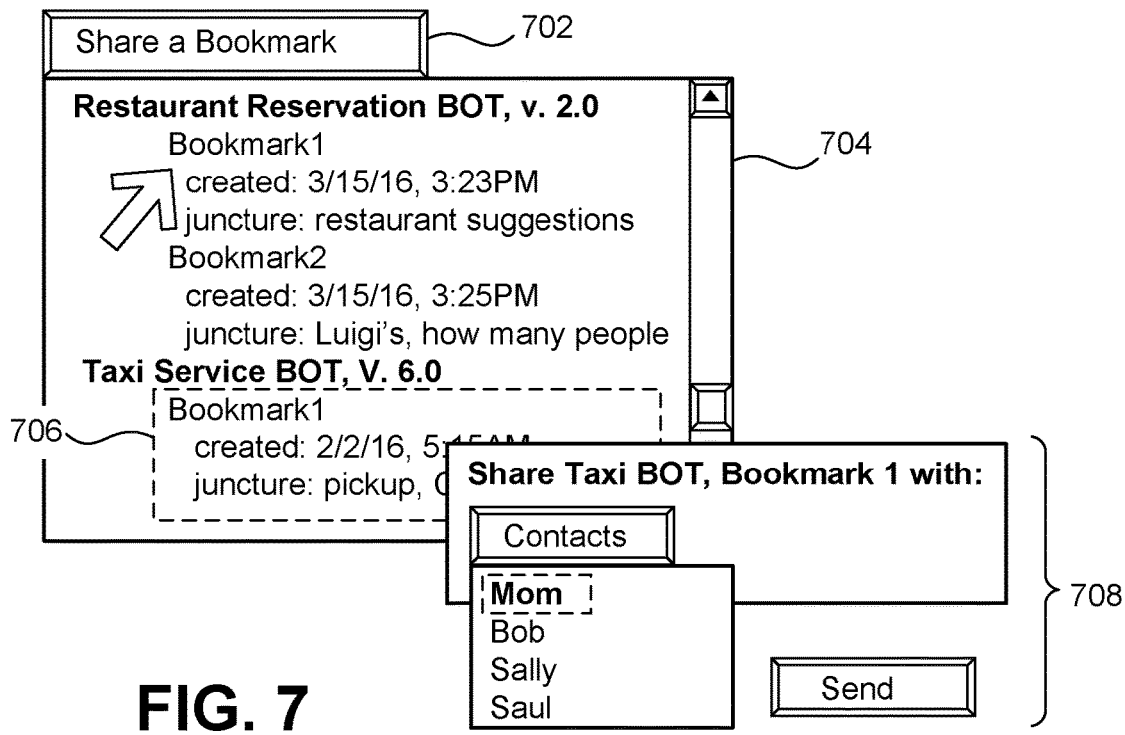
FIG. 7 shows an interactive user interface presentation that enables the user to forward a bookmark to another user.

In FIG. 7, assume that the user now activates a "Share a Bookmark" graphical control feature 702. In response, the bookmark interface component 110 presents a graphical panel 704 which again shows a list of bookmarks that have been created. Assume that the user next selects a visual representation 706 of "Bookmark1" created by the taxi service-related BOT. In response, the bookmark interface component 110 presents a graphical control feature 708 that invites the user to select one or more recipients. Upon making a selection and activating a send control feature, the bookmark sharing component 118 sends the selected bookmark to the target recipient(s). The bookmark sharing component 118 can use any communication channel to transfer the bookmark, including a Short Message Service (SMS) exchange, an Email exchange, an instant messaging (IM) exchange, a custom bookmark-specific control channel, etc.

Figure 8:
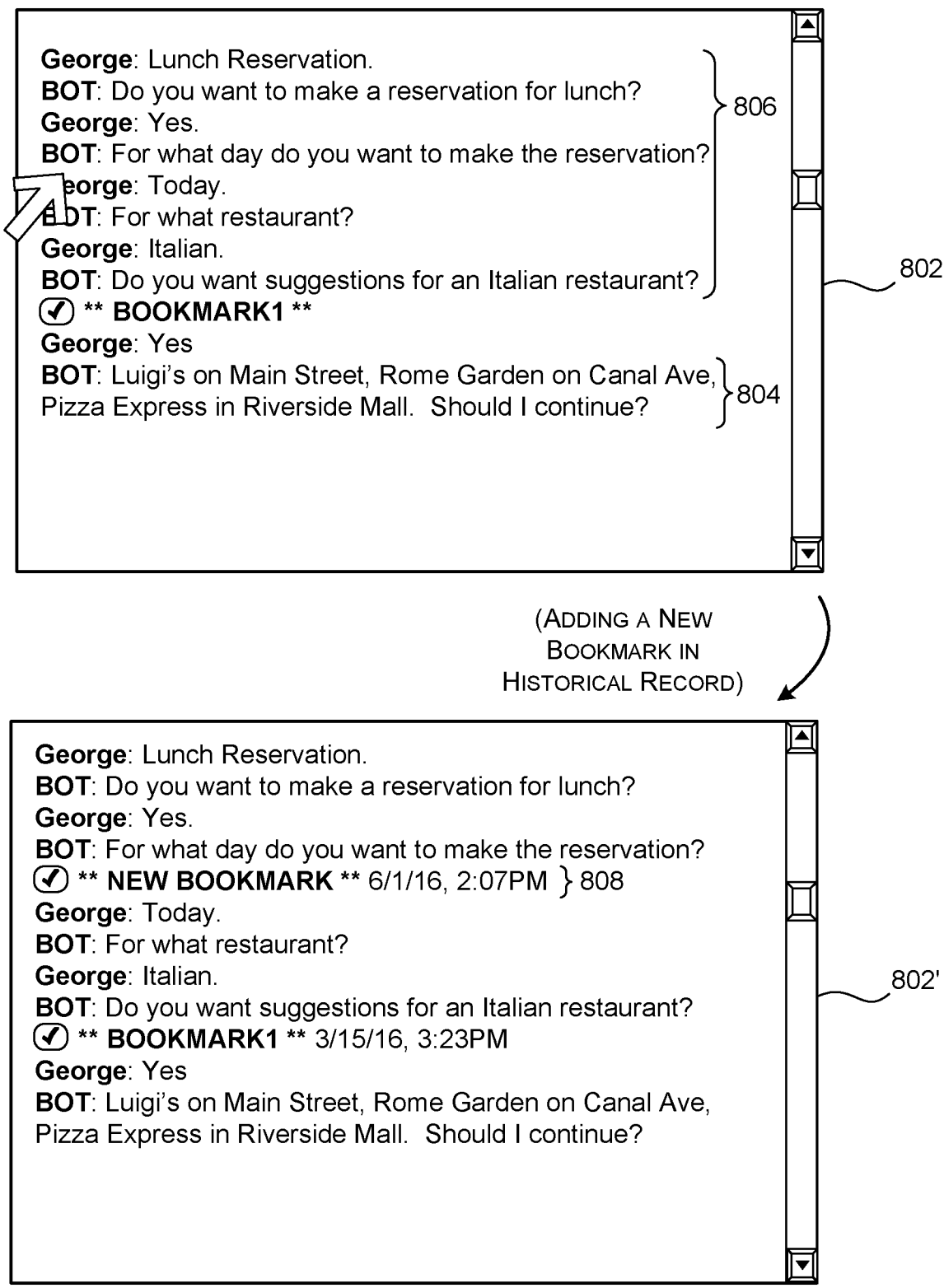
FIG. 8 shows an interactive user interface presentation that enables the user to create a bookmark at a particular prior juncture in a recorded dialog, rather than at a current juncture in an ongoing conversation (as is the case in the example of FIG. 4).

In the case of FIG. 8, a region 802 presents a list of messages exchanged between the user and a BOT. Assume that a message 804 marks the most recent message in an evolving (ongoing) dialog at the current time. Assume that the user scrolls through a list of prior messages 806 to select an earlier juncture in the dialog, and thereafter selects the "Create a Bookmark" graphical control feature 406 of FIG. 4. In response, the bookmark storing component 112 creates a new bookmark at the juncture designated by the user. The bottom region 802' of FIG. 8 shows a visual representation 808 of the new bookmark.

In other words, in the examples leading up to FIG. 8, the user has created each bookmark to mark a current state in an evolving (ongoing) dialog, e.g., by memorializing the current point in time. But in the example of FIG. 8, the user retrospectively creates a bookmark in a historical transcript of messages.

A.3. Representative Implementations of a Bookmarking System

Figure 9:
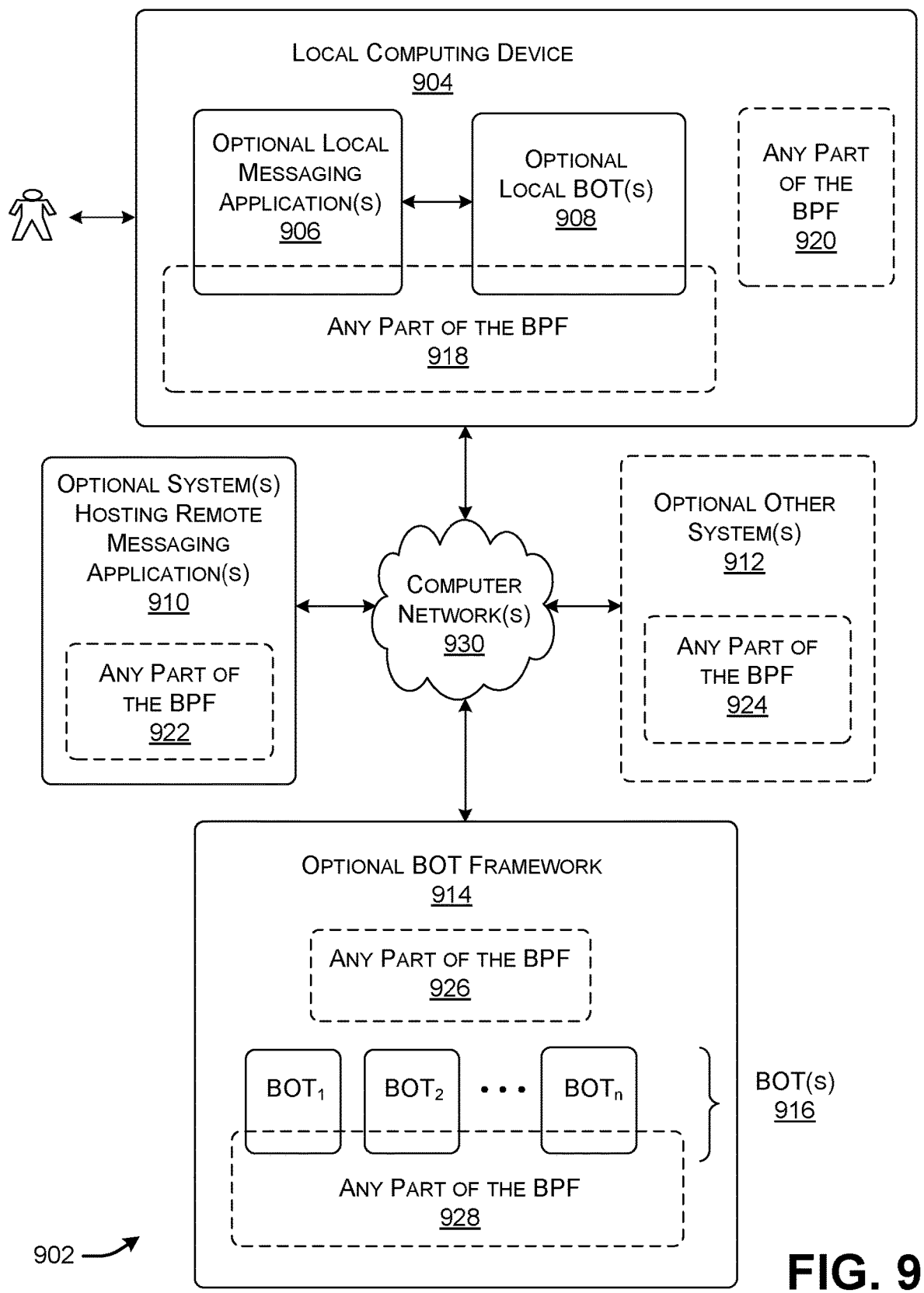
FIG. 9 shows one illustrative system that implements the environment of FIG. 1.

FIG. 9 shows one illustrative system 902 that implements the environment 102 of FIG. 1. The system 902 includes a user computing device 904 that the user uses to interact with a BOT. The user computing device 904 can corresponding to any computing equipment, such as a stationary personal computing device, a laptop computing device, any handheld computing device (such as a smartphone), a game console, a set-top device, a wearable computing device, an intelligent appliance, etc.

The computing device 904 may host one or more local applications, including one or more local messaging applications 906. The computing device 904 may also host one or more local BOTs 908, installed on the computing device 904.

The local computing device 904 may also interact with one or more remote system(s) 910 that host one or more messaging applications, and/or one or more remote system (s) 912 that host other applications and/or services. Each of the remote system(s) (910, 912) may correspond to one or more server computing devices and other computing equipment (e.g., load balancers, firewall functionality, etc.).

The system 902 also includes a BOT framework 914, which corresponds to a computer platform for hosting one or more BOTs 916 of any type. The BOT framework 914 may correspond to one or more server computing devices and other computing equipment.

Figure 12:
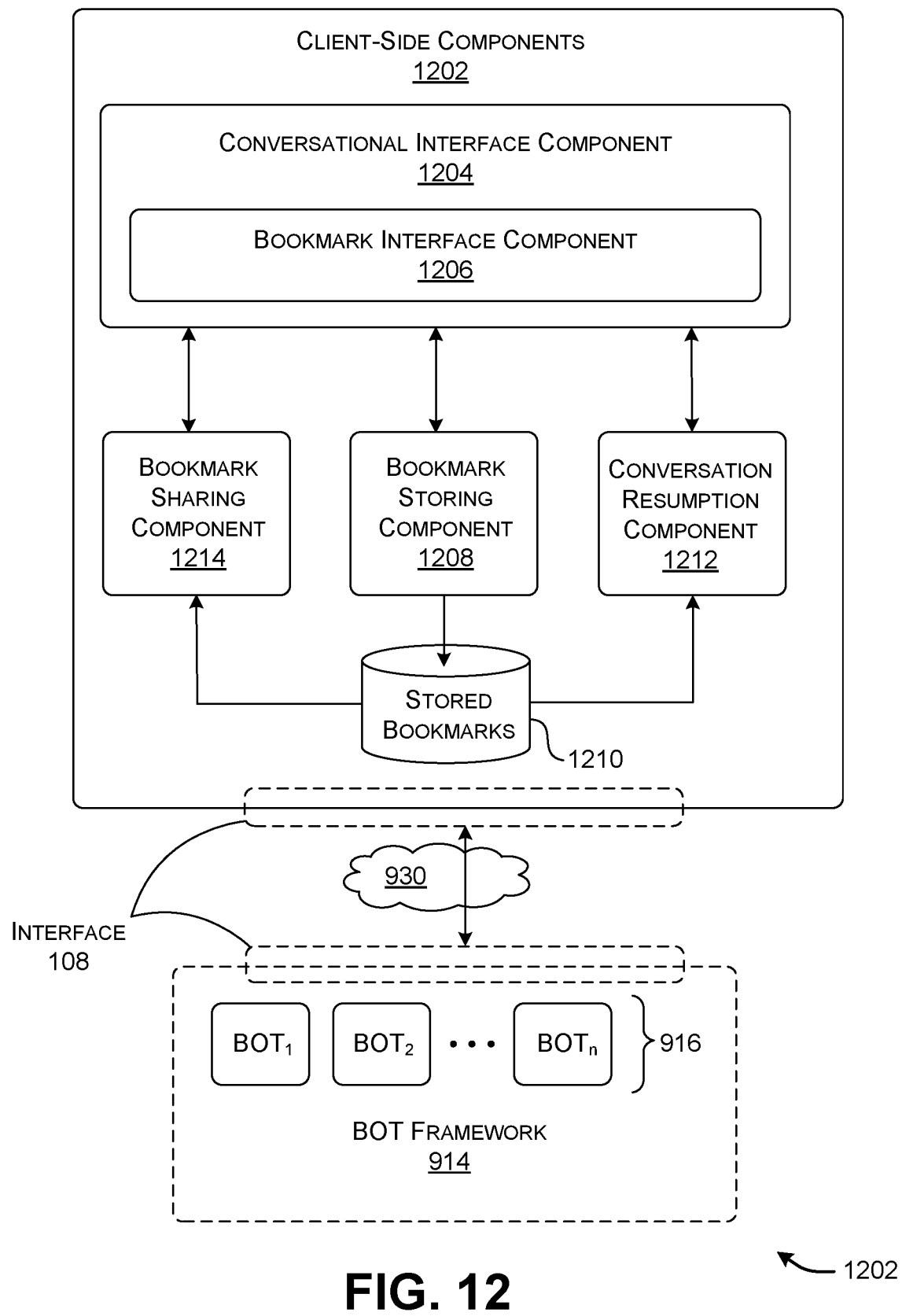
FIGS. 12-14 show systems which respectively represent three different instantiations of the system of FIG. 9.
Figure 13:
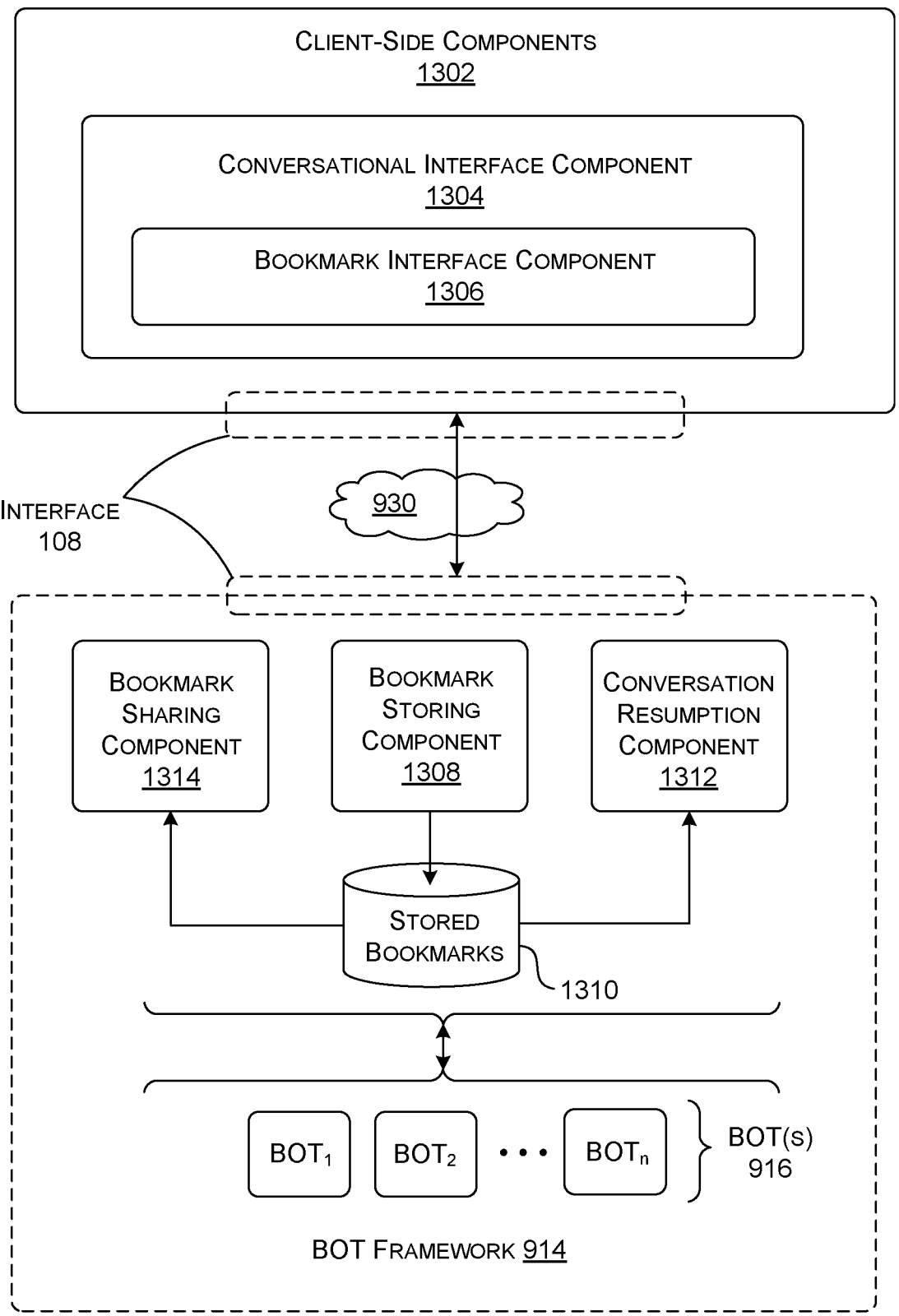
Figure 14:
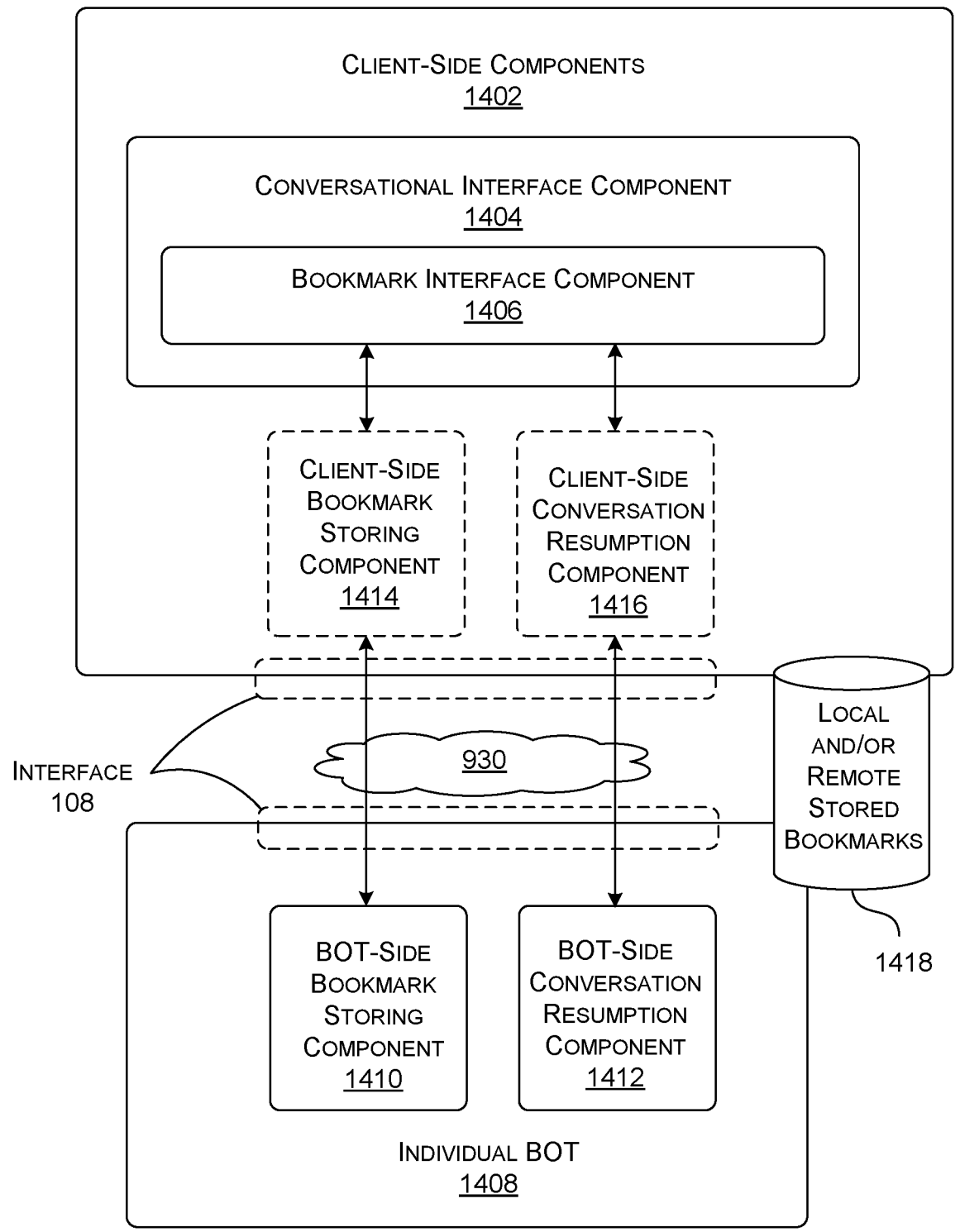

Finally, FIG. 9 makes the point that any of the bookmark processing functionality (BPF) 122 introduced in the context of FIG. 1 can be distributed among any of the components shown in FIG. 9. For instance, the local messaging application(s) 906 and/or the local BOT(s) 908 (if used) can incorporate instances of local BPF 918. Alternatively, or in addition, the local computing device 904 can include one or more other operating system (OS) and/or application components that implement additional instances of local BPF 920 (not associated with the local messaging application(s) 906 or local BOT(s) 908). Alternatively, or in addition, the remote system(s) (910, 912) can include additional instances of BPF (922, 924). Alternatively, or in addition, the BOT framework 914 can include additional BPF 926 on a platform level (rather than individual BOT level). Alternatively, or in addition, and each individual BOT can include BPF 928. Any instance of BPF illustrated in FIG. 9 can implement any subset of functions introduced above in the context of FIG. 1. FIGS. 12-14, described below, show three representative distributions of BPF functions among the components shown in FIG. 9.

One or more computer networks 930 couple the above-described components together. The computer network(s) 930 can correspond to any of a local area network, a wide area network (e.g., the Internet), one or more point-to-point links, etc.

FIG. 10 shows one implementation of a representative BOT 1002 that can used in the system 902 of FIG. 9. At the outset, however, it is pointed out that the system 902 is specifically designed to interact with a wide variety of BOTs of different types; the particular BOT 1002 shown in FIG. 10 is presented here in the spirit of illustration, not limitation.

In one implementation, the BOT 1002 includes four principal parts. As a first part, an optional speech recognition component 1004 receives an input signal from one or more audio input devices (not shown). In some cases, for instance, that input signal expresses a user's utterance as an audio waveform signal, captured by one or more microphones. The speech recognition component 1004 converts the input signal into recognized speech information. The speech recognition component 1004 can use any analysis component(s) (labeled in FIG. 10 as AC(s)) to perform this task, such as a deep-learning neural network of any type.

In an alternative case, the BOT 1002 receives the user's messages in text form, which, for instance, the user may type into an input interface. In this case, the BOT 1002 omits use of the speech recognition component 1004 in its processing of the input messages.

In a second part, a language understanding (LU) component 1006 optionally uses one or more analysis components (AC(s)) to interpret the user's utterance. Additional information regarding one implementation of the LU component 1006 is set forth below with respect to FIG. 11. The LU component 1006 outputs an interpreted user utterance.

In a third part, a dialog management component 1008 uses one or more analysis components (AC(s)) to track the state of the ongoing conversation and to map the interpreted user utterance into a BOT utterance. The BOT utterance represents the BOT's response to the user's utterance. In one implementation, the dialog management component 1008 can use a machine-learned model (such as deep-learning neural network) to perform its mapping operation. Alternatively, or in addition, the dialog management component 1008 can use a rule application engine to perform its mapping operation. Alternatively, or in addition, the dialog management component 1008 can choose a BOT utterance based on one or more dialog script templates provided in a data store 1010, and so on.

In a fourth part, a response output component 1012 converts the BOT utterance generated by the dialog management component 1008 into an appropriate output form, and then sends the converted BOT utterance to user. For example, the response output component 1012 can use a text-to-speech synthesizer to convert a text-based indication of the BOT utterance into audio form.

FIG. 11 shows one implementation of the language understanding (LU) component 1006 of FIG. 6. The LU component 1006 includes at least one domain determination component 1102, at least one intent determination component 1104, and at least one slot value determination component 1106.

More specifically, the domain determination component 1102 determines the most probable domain associated with the input user utterance. A domain pertains to the general theme to which an input utterance pertains, which may correspond to a set of tasks handled by a particular application, or a subset of those tasks. For example, the command "find Mission Impossible" pertains to a media search domain. In other cases, the user explicitly chooses the domain by selecting a particular type of BOT, which is configured to handle tasks associated with a particular domain.

The intent determination component 1104 determines an intent associated with the input user utterance. An intent corresponds to an objective that a user likely wishes to accomplish by submitting an input utterance. For example, a user who submits the command "find Mission Impossible" intends to find a particular movie having the name of "Mission Impossible." A user who submits the command "buy Mission Impossible" intends to purchase the movie "Mission Impossible," and so on.

The slot value determination component 1106 determines slot values in the input utterance. The slot values correspond to information items that an application needs to perform a requested task, upon interpretation of the input utterance. For example, the command, "find Jack Nicolson movies in the comedy genre" includes a slot value "Jack Nicolson" that identifies an actor having the name of "Jack Nicolson," and a slot value "comedy," corresponding to a requested genre of movies.

Any of the domain determination component 1102, intent determination component 1104, and slot value determination component 1106 can use any technology to perform their respective functions. For example, any of these components (1102, 1104, 1106) can use one or more machine-learned models. To cite merely one illustrative and non-limiting case, the domain determination component 1102 may correspond to a machine-learned classification model, such as a linear model, a deep-learning neural network model, a clustering-based model, a decision tree model, a support vector machine model, and so on. The intent determination component 1104 can likewise correspond to any of these kinds of models.

The slot value determination component 1106 may correspond to a machine-learned Conditional Random Fields (CRF) model. In this approach, a CRF model provides the most probable slot sequence defined by:

$$\hat{Y} = \underset{Y}{\operatorname{argmax}} p(Y \mid X).$$

In this equation, the term X refers to a sequence of tokens in a detected linguistic item $(x_1, x_2, \ldots, x_T)$ and Y refers to a sequence of tags $(y_1, y_2, \ldots, y_T)$ assigned to the tokens, where the tags are selected from a set C of possible tags. The tags correspond to slot variables, such as, in the media search domain, the tags, "actor name," "release date," "genre," etc. In the above example, the CRF model would determine that the term "Jack Nicolson" corresponds to an actor name, having the particular value "Jack Nicolson."

Alternatively, or in addition, any of the domain determination component 1102, the intent determination component 1104, and/or the slot value determination component 1106 can use a rule application engine to perform its respective analysis. For example, any of these components (1102, 1104, 1106) can apply rules which maps certain keywords in an input utterance into appropriate classification results. For instance, the intent determination component 1104 can apply a rule that indicates that any input utterance that matches the template "buy <x>" refers to an intent to buy a particular product, where that product is identified by the value of variable x.

FIGS. 12-14 show systems which respectively represent three different instantiations of the system 902 of FIG. 9. Starting with FIG. 12, client-side components 1202 implement all aspect of the BPF 122 of FIG. 1. The client-side components 1202, for instance, may correspond to a local messaging application, a standalone BPF component, etc., or any combination thereof. The BPF 122 includes at least a conversational interface component 1204 (which incorporates a bookmark interface component 1206), a bookmark storing component 1208, one or more data stores 1210 for storing bookmarks and dialog transcripts, a conversation resumption component 1212, and a bookmark sharing component 1214. Each of these features performs the same functions as the same-named components described above in the context of FIG. 1. The client-side components 1202 interact with the BOT framework 914 via the interface 108. The BOT framework 914 hosts a plurality of BOTs 916.

Advancing to FIG. 13, in this figure, client-side components 1302 implement a conversational interface component 1304. The conversational interface component 1304, in turn, includes the bookmark interface component 1306.

The BOT framework 914 implements all other aspects of the BPF 122 on a platform level (rather than on an individual BOT level). For instance, the BOT framework 914 may include a library of functional modules which implements a bookmark storing component 1308, the data store(s) 1310, the conversation resumption component 1312, and the bookmark sharing component 1314.

FIG. 14 shows a third implementation in which client-side components 1402 continue to implement a conversational interface component 1404. The conversational interface component 1404, in turn, includes the bookmark interface component 1406.

But unlike the case of FIG. 13, the implementation of FIG. 14 includes changes made to a representative BOT 1408 itself, rather than, or in addition to, changes made on the BOT framework level. In one case, the BOT 1408 implements a BOT-side bookmark storing component 1410 and a BOT-side conversation resumption component 1412, with no supporting complementary functionality in the client-side components 1402. In another implementation, the client-side components 1402 include a client-side bookmark storing component 1414 that works in conjunction with the BOT-side bookmark storing component 1410. The client-side components 1402 also include a client-side conversation resumption component 1416 that works in conjunction with the BOT-side conversation resumption component 1412. One or more data stores 1418 can store the created bookmarks. The data store(s) 1418 may be implemented by any component(s) shown in FIG. 9, including the local computing device 904, the BOT framework 914, the individual BOT 1408, etc.

One manner of operation of the implementation of FIG. 14 will be described below, in the context of the explanation of the BOT-specific bookmark shown in FIG. 16.

In summary, FIGS. 12 and 13 show an implementation of the conversational bookmarking service that is agnostic and independent with respect to the design of the BOTs 916 in the BOT framework 914. This means that these implementations can work in conjunction with any BOTs, regardless of their individual characteristics. FIG. 14 shows an implementation that involves changes to at least one individual BOT 1408; this implementation therefore takes account for the characteristics of the individual BOT 1408.

The implementations illustrated in FIGS. 12-14 represent three of many possible allocations of BPF functions among system components. Many other allocations are possible.

FIG. 15 shows one implementation of a BOT-independent bookmark 1502. The implementations of FIGS. 12 and 13 can use this type of bookmark 1502 to provide a BOT-independent bookmarking service in the manner described below.

The bookmark 1502 can include one or more metadata values, such as metadata values that describe the identity of the user, the profile characteristics of the user, the type of the BOT, the version of the BOT, the time and date that the bookmark was created, and so on. The bookmark 1502 can also record the information used to represent the bookmark in the user interface presentations, e.g., when the user activates the "Show Bookmarks" control feature. The bookmark 1502 can also capture a series of user messages in the dialog, starting from the beginning of the dialog up to the juncture at which the bookmark 1502 is created. In addition, the bookmark 1502 can optionally include a series of BOT messages in the dialog, starting from the beginning of the dialog up to the juncture at which the bookmark is created. In addition, the bookmark 1502 can optionally include any supplemental content items that the user has supplied in the course of the dialog, such as one or more images, videos, audio files, contacts, etc.

Consider the Bookmark1 created at juncture 208 of FIG. 2. When formed in the manner shown in FIG. 15, the Bookmark1 can include the following sequence of user messages: (1) "Lunch reservation," (2) "Yes," (3) "Today," and (4) "Italian." In addition, the Bookmark1 can optionally store the BOT's messages up to the juncture 210.

Consider one way in which the BOT-independent implementation of FIG. 13 (to cite one example) can operate in conjunction with the bookmark type shown in FIG. 15. When the user activates a request to create Bookmark1, the bookmark storing component 1308 collects the elements described above, including at least the sequence of user messages in the dialog. The bookmark storing component 1308 can then store the Bookmark1 in the data store(s) 1310.

When the user next activates Bookmark1, the conversation resumption component 1312 will feed each user message in quick succession to the BOT. This will cause the BOT, if it is operating in the same manner as before, to issue the same series of responses shown in FIG. 2. In one implementation, the conversation resumption component 1312 can display the conversation as it is being reconstructed on the user interface presentation, up to the juncture 208 associated with the bookmark. In another case, the conversation resumption component 1312 can suppress the presentation of the reconstructed dialog, at least until the juncture 208 is reached. In either case, the conversation resumption component 116 can be expected to restore the conversation to juncture 208 in a very short period of a time (e.g., a fraction of a second in some cases, and a few seconds in other cases, etc.), with no effort required on the user's part. Further note that this strategy requires no changes to the BOT itself. From the BOT's perspective, it is responding to whatever message is fed to it in a same predictable manner, whether that message reflects an original utterance by a real user, or a replayed message by the conversation resumption component 116.

There are at least three cases in which the BOT's behavior may diverge from the ideal behavior described above. In a first case, a first version of the BOT may have existed at the time the bookmark was created, and a second version of the BOT may exist at the time the bookmark is activated. For instance, the BOT can include one or more machine-learned models (as described above), which a developer may update on a relatively frequent basis. One or more updates may occur between the creation and resumption of the bookmark. In a second case, the BOT itself may not have changed, but the informational environment in which it operates may have changed between the creation and the resumption of the bookmark. For instance, the BOT may consult a database of restaurants in a particular city, which may change between the creation and the resumption of the bookmark. In a third case, the BOT can introduce some degree of randomization in its generation of messages, either deliberately to provide a desired variety of responses, or as byproduct of its internal processes. In each such case, the BOT cannot be guaranteed to play back the same responses that it provided on an earlier occasion, even though it is fed the exact same user messages.

A BOT-agnostic strategy can handle the above-noted issues in different ways. In one approach, the conversation resumption component 1312 can present the same set of user messages that appear in the original dialog with the BOT. The conversation resumption 1312 can then ignore any variations between the new BOT responses (produced upon activating the bookmark) and the previous BOT responses (produced during the original dialog in which the bookmark was created). This option is based on the environment-specific premise that any such variations will be small and nonconsequential.

In a second approach, the conversation resumption component 1312 can activate the version of the BOT that existed at the time of the previous dialog, even though this version is not the most recent version. This option assumes that the BOT framework 914 retains older versions of the BOT, and allows users to activate those older versions. The bookmark itself can store information regarding the version of the BOT that was used at the time of the bookmark's creation.

In a third approach, the conversation resumption component 1312 can feed a user message (U1) to the BOT. It then determines whether the current response (B1') to the user message (U1) differs from a previous response (B1), which corresponds to an expected response that is stored by the BPF 122. When such a variation is detected, the conversation resumption component 1312 can submit one or more messages to the BOT with the objective of steering it along the same path as the previous dialog. For example, in FIG. 2, the user initiates the conversation by issuing the command, "Lunch reservations." The BOT responds by asking the user whether he wants to make a reservation for lunch. Assume that, upon activation of the Bookmark1, the BOT now responds to the user's message by saying, "Are you inquiring about an existing reservation?" The conversation resumption component 1312 can respond to this discrepancy by using a machine-trained rephrasing model to rephrase the initial user message, e.g., by generating and submitting the new message, "Make a new lunch reservation." This clarified message may prompt the BOT to now provide the desired response that conforms to the previous dialog. In essence, then, the conversation resumption component 1312 can re-ask the question until it gets the expected response.

FIG. 16 shows one implementation of a BOT-dependent bookmark 1602. The implementation of FIG. 14 can use this type of bookmark 1602 to provide a BOT-dependent bookmarking service in the manner described below.

The bookmark 1602 can include the same type of metadata values described above with respect to FIG. 15. The bookmark 1602 can also store the information used to represent the bookmark in the user interface presentations. In addition, the bookmark 1602 can include a BOT-specific serialized state associated with a particular juncture in the dialog designated by the bookmark 1602. The serialized state can provide a BOT-specific representation of the user messages up to the juncture associated with the bookmark, and optionally a BOT-specific representation of the BOT's responses to the user's messages up to the juncture associated with the bookmark. The serialized state can also include reference to any content items provided by the user in the course of the dialog.

The serialized state can also include any information that expresses conclusions reached by the BOT in the course of the dialog. These conclusions represent insight gleaned by the BOT up to the juncture associated with the bookmark, and possibly after the juncture associated with the bookmark. For instance, assume that the BOT concludes that the user is performing a particular task that involves specifying a set of slot values, and that the user has successfully supplied a subset of these slot values, but not other slot values. The BOT-derived conclusions can identify the slot values that the user has supplied, and/or the slot values that the user has yet to supply. In another case, the BOT-derived conclusions may reflect intermediate output information generated by one or more analysis components provided by the BOT.

Consider the manner in which the implementation of FIG. 14 can operate with respect to the bookmark 1602 of FIG. 16. When the user activates a request to create a bookmark, the client-side bookmark storing component 1414 can send a request to the BOT-side bookmark storing component 1410, e.g., using an Application Programming Interface (API) or some other interface technique. In response, the BOT-side bookmark storing component 1410 can serialize the designated state and create the bookmark 1602, which incorporates this serialized state as one of its information items. The BOT-side bookmark storing component 1410 can then return the thus-created bookmark 1602 to the client-side bookmark storing component 1414, whereupon the client-side bookmark storing component 1414 stores the bookmark 1602 in the data store(s) 1418.

When the user makes a request to activate the particular bookmark 1602, the client-side conversation resumption component 1416 can retrieve a corresponding bookmark 1602 from the data store(s) 1418, and send the bookmark 1602 to the BOT-side conversation resumption component 1412. The BOT-side conversation resumption component 1412 de-serializes the state conveyed by the bookmark 1602, which effectively advances the BOT 1408 to the appropriate juncture of the dialog.

In the course of de-serializing the state, the BOT 1408 can also leverage any BOT-derived conclusions which are expressed in the bookmark 1602 itself. These BOT-derived conclusions can guide the BOT 1408 in following the same path of a previous dialog, up to the particular juncture designated by the bookmark. This capability thereby gives the conversation resumption functionality some added resilience to address intervening changes in the BOT or changes in the informational environment, etc.

For instance, assume that the BOT asks a series of questions in a first order upon an initial presentation of a dialog. Further assume that the BOT asks the same questions in a different order when the bookmark is later invoked. The BOT can successfully restore a previous state because it also stores an order-agnostic list of answers that the user has provided, which it can rely on to fill in the slot values, independent of the user's current messages. More concretely stated, assume that, upon invocation of a bookmark, the BOT asks, "What is the name of the restaurant?," and, in response, the stored user message reads, "8:00 PM," which reflects an answer to another question. In this case, the BOT has insight into what question it is asking, and has access to the user's previous answer to this question (e.g., "Luigi's). It can therefore accept the information that is specifically designated as the answer, rather than the user's message ("8:00 PM") which is being played back at this juncture; this mode of operation is based on the premise that the stored information that is specifically earmarked as the correct answer has a higher confidence by default.

As described above, the bookmark storing functionality can store any bookmark (either BOT-independent or BOT dependent) as a URL, or in some other form. For particularly long bookmarks, the bookmark storing functionality can include an identifier in the bookmark which points to its bookmark contents. The bookmarking storing functionality can then separately store the bookmark contents, e.g., as a file.

Figure 17:
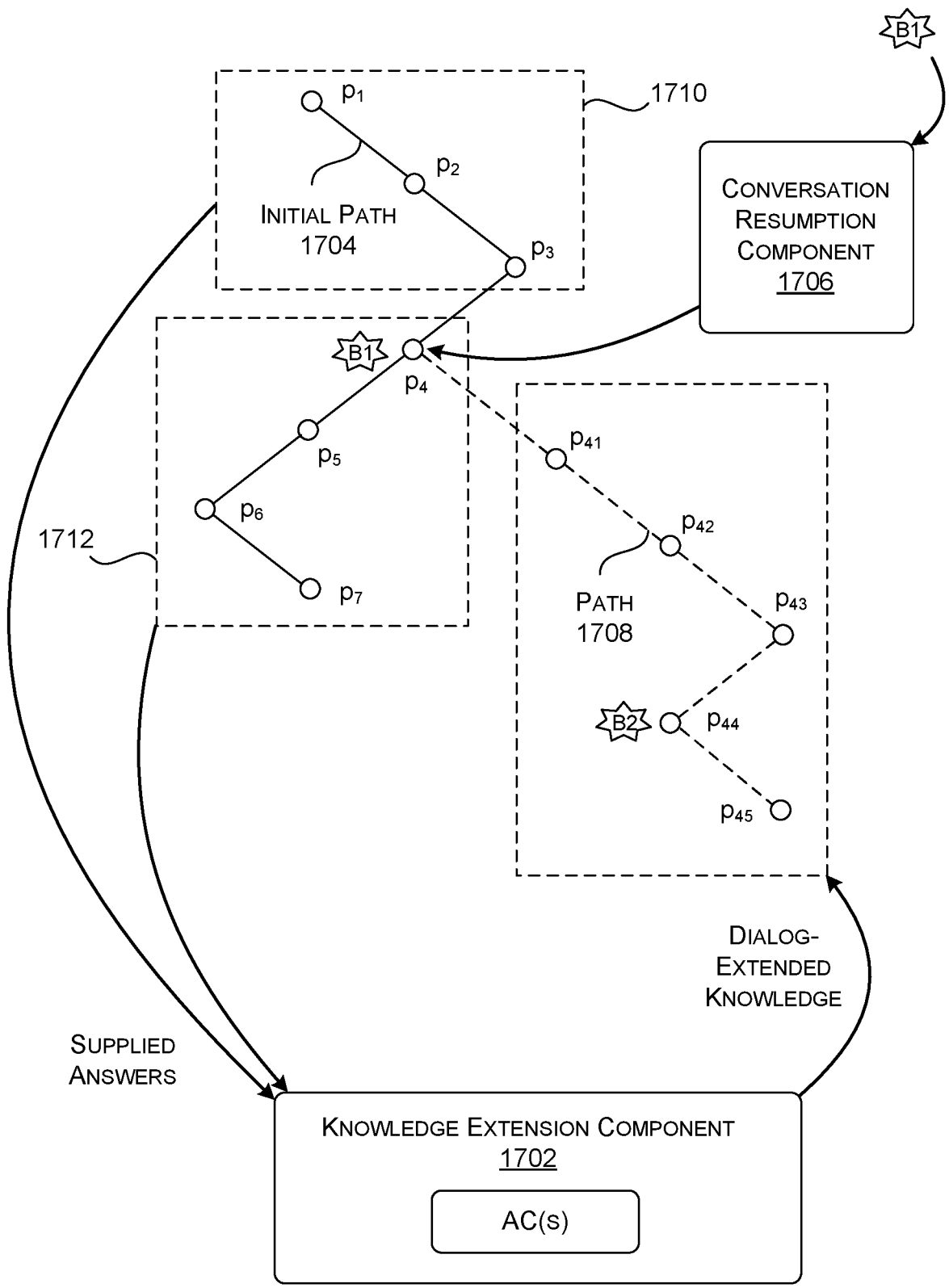
FIG. 17 shows one implementation of a knowledge extension component, the purpose of which is to apply knowledge gained via one part of a dialog to another part of the dialog.

FIG. 17 shows a knowledge extension component 1702, the purpose of which is to apply knowledge learned in a first part of a dialog to another part of the dialog. For instance, assume that a user performs a dialog represented by path 1704, corresponding to seven successive dialog turns $p_1$-$p_7$. Assume that, in the course of that dialog, the user creates a bookmark B 1, generally marking the completion of turn $p_4$. Upon later activation of the bookmark B1, a conversation resumption component 1706 uses a BOT-agnostic or BOT-dependent strategy to advance to the particular juncture designated by the bookmark B1. Thereupon, the user continues the dialog along a new path 1708, which includes new turns $p_{41}$-$p_{45}$. In this example, the knowledge extension component 1702 can apply knowledge that is gained in the first path 1704 in the course of interacting with the user along the course of the new path 1708.

In some cases, the knowledge extension component 1702 takes into consideration only knowledge that can be gleaned from a portion 1710 of the first path 1704 prior to the bookmark B 1. In other cases, the knowledge extension component 1702 can also take into consideration knowledge gained from a portion 1712 of the first path 1704, after the bookmark B 1.

Consider the following example. A user may interact with a BOT to make a lunch reservation. In portion 1712, the user specifies that the reservation at a particular restaurant should be made under the name of George Smith, corresponding to the user's name. In path 1708, the user may choose a new restaurant at which to dine. But the information regarding the name under which the reservation is made is likely still "George Smith." The BOT can leverage this finding by stating this assumption, giving the user to the opportunity to change it if need be.

In another case, a user may specify a reservation time in the first portion 1710, prior to the creation of the bookmark B1. Again, in path 1708, the user chooses a new restaurant at which to dine, but the user may not also designate a new reservation time. The knowledge extension component 1702 can conclude that the user's selections in the path 1708 raise a question regarding the continued appropriateness of the user's previous reservation time (specified in the initial path 1704). In response, the BOT may ask the user to confirm the meeting time of the reservation, even though the user has already specified this information.

In one implementation, the BPF 122 implements the knowledge extension component 1702 in a BOT-independent manner. In another implementation, the BPF 122 can implement the knowledge extension component 1702 in a BOT-specific manner. In either case, the knowledge extension component 1702 can make the above-described decisions using any analysis components (AC(s)), such as a rules-based system, a machine-learned model, etc., or any combination thereof. For example, a machine-learned model can learn, based on a training set, that a previously stated reservation name is a more stable piece of information than a previously stated reservation time; hence, a previously stated reservation name is more likely to remain the same in a new dialog branch compared to a previously stated reservation time.

B. Illustrative Processes

Figure 18:
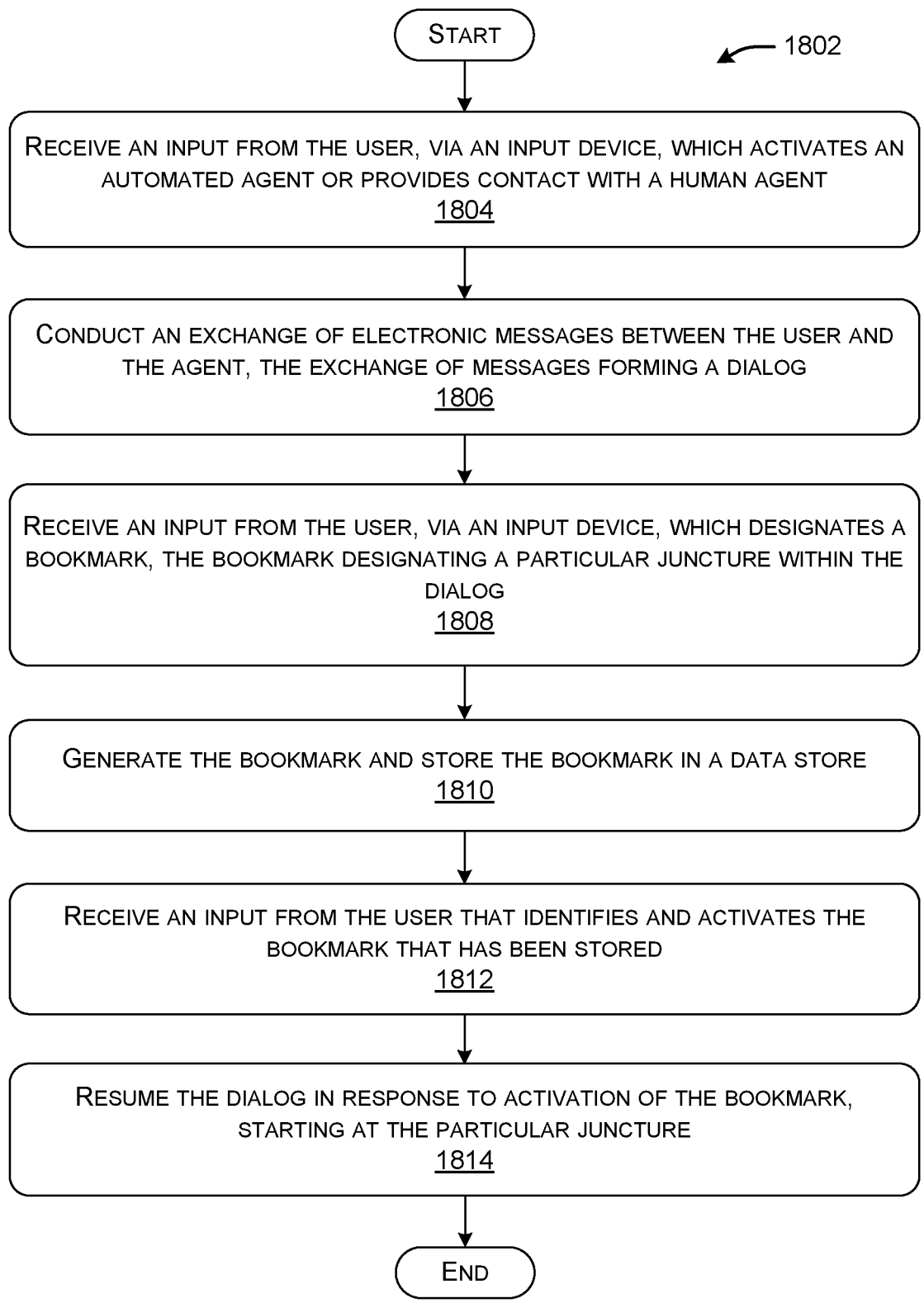
FIG. 18 shows a process that represents one manner of operation of the system of FIG. 9.

FIG. 18 shows a process 1802 that explains the operation of the system 902 of FIG. 9 in flowchart form. Since the principles underlying the operation of the system 902 have already been described in Section A, certain operations will be addressed in summary fashion in this section. As noted in the prefatory part of the Detailed Description, the flowchart is expressed as a series of operations performed in a particular order. But the order of these operations is merely representative, and can be varied in any manner.

In block 1804, the bookmark processing functionality (BPF) 122 receives an input from the user, via an input device, which activates an automated agent, or which provides contact with a human agent. In block 1806, the BPF 122 conducts an exchange of electronic messages between the user and the automated agent, the exchange of messages forming a dialog. In block 1808, the BPF 122 receives an input from the user, via an input device, which specifies a bookmark to be created. The bookmark designates a particular juncture within the dialog. In block 1810, the BPF 122 generates the bookmark and stores the bookmark in a data store. In block 1812, the BPF 122 receives an input from the user that identifies and activates the bookmark that has been stored. In block 1814, the BPF 122 resumes the dialog in response to activation of the bookmark, starting at the particular juncture.

C. Representative Computing Functionality

Figure 19:
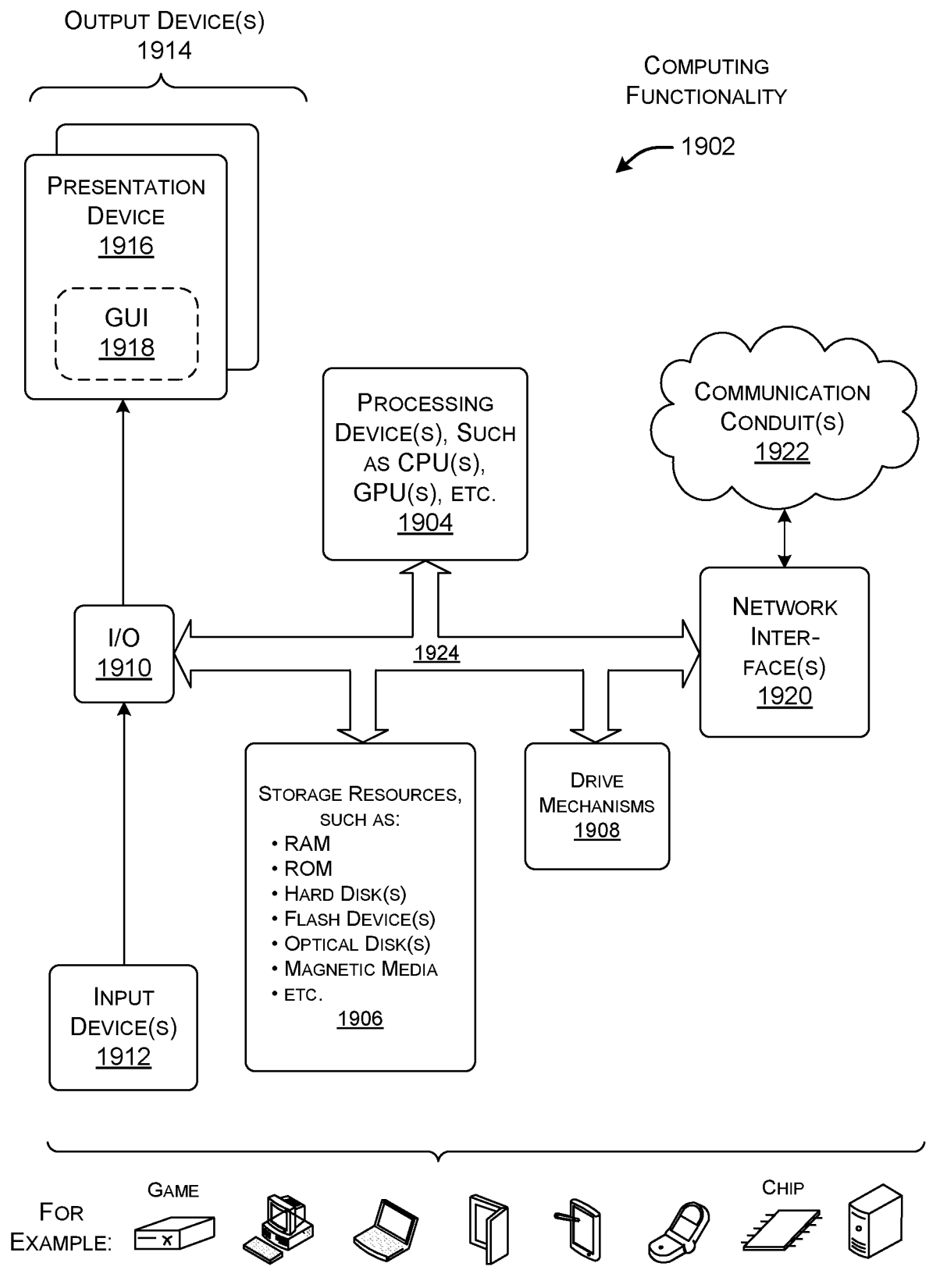
FIG. 19 shows illustrative computing functionality that can be used to implement any aspect of the features shown in the foregoing drawings.

FIG. 19 shows computing functionality 1902 that can be used to implement any aspect of the mechanisms set forth in the above-described figures. For instance, the type of computing functionality 1902 shown in FIG. 19 can be used to implement any of features of the system 902 of FIG. 9, including any of the local computing device 904, the remote system(s) (910, 912), the BOT framework 914, individual BOTs 916, etc. In all cases, the computing functionality 1902 represents one or more physical and tangible processing mechanisms.

The computing functionality 1902 can include one or more hardware processor devices 1904, such as one or more central processing units (CPUs), and/or one or more graphical processing units (GPUs), and so on. The computing functionality 1902 can also include any storage resources (also referred to as computer-readable storage media or computer-readable storage medium devices) 1906 for storing any kind of information, such as machine-readable instructions, settings, data, etc. Without limitation, for instance, the storage resources 1906 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removable component of the computing functionality 1902. The computing functionality 1902 may perform any of the functions described above when the hardware processor device(s) 1904 carry out computer-readable instructions stored in any storage resource or combination of storage resources. For instance, the computing functionality 1902 may carry out computer-readable instructions to perform each block of the process 1802 described in Section B. The computing functionality 1902 also includes one or more drive mechanisms 1908 for interacting with any storage resource, such as a hard disk drive mechanism, an optical disk drive mechanism, and so on.

The computing functionality 1902 also includes an input/output component 1910 for receiving various inputs (via input devices 1912), and for providing various outputs (via output devices 1914). Illustrative input devices include a keyboard device, a mouse input device, a touchscreen input device, a digitizing pad, one or more video cameras, one or more depth cameras, a free space gesture recognition mechanism, one or more microphones, a voice recognition mechanism, any movement detection mechanisms (e.g., accelerometers, gyroscopes, etc.), and so on. One particular output mechanism may include a display device 1916 and an associated graphical user interface presentation (GUI) 1918. For instance, the bookmark interface component 110 can present its various user interface presentations shown in the figures on the display device 1916. The display device 1916 may correspond to a charge-coupled display device, a cathode ray tube device, a projection mechanism, etc. Other output devices include one or more speakers, a haptic output mechanism, an archival mechanism (e.g., for storing a historical log of a dialog), and so on. The computing functionality 1902 can also include one or more network interfaces 1920 for exchanging data with other devices via one or more communication conduits 1922. One or more communication buses 1924 communicatively couple the above-described components together.

The communication conduit(s) 1922 can be implemented in any manner, e.g., by a local area computer network, a wide area computer network (e.g., the Internet), point-to-point connections, etc., or any combination thereof. The communication conduit(s) 1922 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 1902 (and its hardware processor) can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc. In this case, the machine-executable instructions are embodied in the hardware logic itself.

The following summary provides a non-exhaustive list of illustrative aspects of the technology set forth herein.

According to a first aspect, one or more computing devices are described for enabling a user to engage with an agent. The computing device(s) include a conversational interface component configured to provide a user interface presentation by which the user can interact with the agent through an exchange of electronic messages, the exchange of messages forming a dialog. The device(s) also include a bookmark interface component configured to receive an input from the user, via an input device, which specifies a bookmark, the bookmark designating a particular juncture within the dialog. The device(s) also includes a bookmark storing component configured to generate the bookmark and store the bookmark in a data store. The bookmark interface component is further configured to receive an input from the user that identifies and activates the bookmark that has been stored. The device(s) further include a conversation resumption component configured to resume the dialog in response to activation of the bookmark, starting at the particular juncture.

According to a second aspect, the agent is an automated agent, and the bookmark storing component and the conversation resumption component are implemented in a manner independent of the automated agent.

According to a third aspect, the agent is an automated agent, and the bookmark storing component and/or the conversation resumption component is implemented in a manner that depends on a configuration of the automated agent.

According to a fourth aspect, the above-referenced one or more computing devices include a local computing device with which the user interacts. The bookmark storing component and/or the conversation resumption component is implemented by the local computing device.

According to a fifth aspect, the above-referenced one or more computing devices include at least one remote computing device, the remote computing device(s) being remote with respect to a local computing device with which the user interacts. The bookmark storing component and/or the conversation resumption component is implemented by the remote computing device(s).

According to a sixth aspect, the above-referenced at least one remote computing device implements a framework that hosts one or more automated agents, including the agent with which the user is interacting.

According to a seventh aspect, the agent is an automated agent, and the bookmark storing component is configured to create the bookmark by storing at least a series of user messages provided by the user from a starting point in the dialog up to the particular juncture. Further, the conversation resumption component is configured to resume the dialog by requesting the automated agent to process the series of user messages.

According to an eighth aspect, the agent is an automated agent, and the bookmark storing component is configured to create the bookmark by requesting the automated agent to capture state information associated with the particular juncture. Further, the conversation resumption component is configured to resume the dialog by requesting the automated agent to advance to a particular state described by the state information.

According to a ninth aspect, the bookmark includes: metadata that identifies the agent; metadata that identifies the user; and metadata that identifies a time at which the bookmark was created.

According to a tenth aspect, the bookmark includes information that identifies at least some of the messages exchanged between the user and the agent, prior to the particular juncture.

According to an eleventh aspect, the agent is an automated agent, and the bookmark includes information that identifies at least one interpretation by the agent of a current state of the dialog.

According to a twelfth aspect, the above-referenced at least one interpretation includes one or more BOT-identified answers to a set of questions associated with a particular task.

According to a thirteenth aspect, the bookmark interface component is further configured to receive an input from the user that identifies a desired recipient. The computing device(s) further includes a bookmark sharing component configured to share the bookmark with the desired recipient. The bookmark enables the desired recipient to commence a dialog from the particular juncture.

According to a fourteenth aspect, the agent is an automated agent, and the one or more computing devices further includes a knowledge extension component that is configured to apply knowledge gained in the dialog, prior to and/or after generating the bookmark, to an exchange of messages between the user and the automated agent following resumption of the dialog.

According to a fifteenth aspect, a method is described, implemented by one or more computing devices, for enabling a user to engage with a computer-implemented agent. The method includes: receiving an input from the user, via an input device, which activates the automated agent; conducting an exchange of electronic messages between the user and the automated agent, the exchange of messages forming a dialog; receiving an input from the user, via the input device, which specifies a bookmark, the bookmark designating a particular juncture within the dialog; generating the bookmark and storing the bookmark in a data store; receiving an input from the user that identifies and activates the bookmark that has been stored; and resuming the dialog in response to activation of the bookmark, starting at the particular juncture.

According to a sixteenth aspect, each of the above-referenced generating of the bookmark and resuming the conversation is implemented in a manner independent of the automated agent.

According to a seventeenth aspect, the above-referenced generating the bookmark and/or the above-referenced resuming the dialog is implemented in a manner that depends on a configuration of the automated agent.

According to an eighteenth aspect, the above-referenced generating of the bookmark involves storing at least a series of user messages provided by the user from a starting point in the dialog until the particular juncture, and the above-referenced resuming of the dialog involves requesting the automated agent to process the series of user messages.

According to a nineteenth aspect, the above-referenced generating of the bookmark involves requesting the automated agent to capture state information associated with the particular juncture. The above-referenced resuming of the dialog involves requesting the automated agent to advance to a particular state described by the state information.

According to a twentieth aspect, a system is described, including one more computing devices, for enabling a user to engage with a computer-implemented agent. The system includes one or more computing devices for implementing bookmark processing functionality. The bookmark processing functionality includes: a conversational interface component configured to provide a user interface presentation by which the user can interact with the automated agent through an exchange of electronic messages, the exchange of messages forming a dialog; a bookmark interface component configured to receive an input from the user, via an input device, which specifies a bookmark, the bookmark designating a particular juncture within the dialog; and a bookmark storing component configured to generate the bookmark and store the bookmark in a data store. The bookmark interface component is further configured to receive an input from the user that identifies and activates the bookmark that has been stored. The bookmark processing functionality further includes a conversation resumption component configured to resume the dialog in response to activation of the bookmark, starting at the particular juncture. The system also includes one or more computing devices for implementing the automated agent. The bookmark processing functionality is implemented in a manner independent of the automated agent.

A twenty-first aspect corresponds to any combination (e.g., any permutation or subset that is not logically inconsistent) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:
   one or more processing devices; and
   a storage device storing computer-executable instructions which, when executed by the one or more processing devices, cause the one or more processing devices to:
   at a first time:
      provide a user interface presentation for a human user to interact with a network-accessible agent through an exchange of electronic messages over a computer network, the exchange of electronic messages forming a dialog between the human user and the network-accessible agent;
      identify a first version of the network-accessible agent that conducts the dialog;
      receive multiple messages from the human user directed to the network-accessible agent during the dialog between the human user and the network-accessible agent;
      provide a first response from the network-accessible agent to the human user based on a first consideration of the multiple messages via a machine learning model;
      receive a bookmark creation request designating a particular juncture within the dialog, the particular juncture being after the human user has provided the multiple messages to the network-accessible agent and prior to the network-accessible agent providing the first response to the multiple messages;
      responsive to the bookmark creation request, generate a bookmark that identifies the particular juncture within the dialog;
      store an identifier of the first version of the network-accessible agent in the bookmark; and
      store the bookmark in a data store with the multiple messages provided by the human user, and;
   at a second time subsequent to the first time:
      receive a bookmark activation request to activate the bookmark;
      retrieve the identifier of the first version of the network-accessible agent responsive to the bookmark activation request;
      determine that a second, subsequent version of the network-accessible agent is available; and
      responsive to the bookmark activation request, retrieve the bookmark with the multiple messages from the data store and resume the dialog between the human user and the network-accessible agent starting at the particular juncture and using the first version of the network-accessible agent instead of the second, subsequent version, the dialog being resumed based on a second consideration of the multiple messages saved with the bookmark via the machine learning model, such that the network-accessible agent provides a second response to the multiple messages, different from the first response.

2. The system of claim 1, wherein the computer-executable instructions, when executed by the one or more processing devices, cause the one or more processing devices to:
generate the bookmark as an agent-independent bookmark that captures all user messages provided by the human user to the network-accessible agent prior to generating the bookmark; and
responsive to activation of the agent-independent bookmark at the second time, send all of the user messages captured by the agent-independent bookmark to the network-accessible agent.

3. The system of claim 1, wherein the computer-executable instructions, when executed by the one or more processing devices, cause the one or more processing devices to:
at the first time, responsive to the bookmark creation request, store at least one image, video, or audio file that the human user has supplied to the network-accessible agent prior to the particular juncture within the dialog; and
at the second time, responsive to the bookmark activation request, send the at least one image, video, or audio file over the computer network to the network-accessible agent.

4. The system of claim 1, wherein the computer-executable instructions, when executed by the one or more processing devices, cause the one or more processing devices to:
store the bookmark by sending the bookmark to a remote computing device for storage in the data store.

5. The system of claim 1, wherein the computer-executable instructions, when executed by the one or more processing devices, cause the one or more processing devices to:
at the second time:
when populating the network-accessible agent, detect that the second response provided by the network-accessible agent in response to a particular user message being reconsidered differs from the first response provided by the network-accessible agent when the particular user message was initially provided to the network-accessible agent at the first time; and
rephrase the particular user message until the network-accessible agent provides a third response that matches the first response.

6. A method implemented by one or more computing devices, the method comprising:
at a first time:
facilitating an exchange of electronic messages between a user and an automated agent over a computer network, the exchange of electronic messages forming a dialog between the user and the automated agent;
identifying a first version of the automated agent that conducts the dialog;
receiving a bookmark creation request, the bookmark creation request specifying a particular juncture within the dialog after the automated agent has provided at least a first response to multiple user messages provided by the user;
associating, with a bookmark, the multiple user messages provided by the user to the automated agent prior to the particular juncture in the dialog;
storing an identifier of the first version of the automated agent in the bookmark; and
storing the bookmark in a data store;
at a second time that is subsequent to the first time:
receiving a bookmark activation request, the bookmark activation request identifying the bookmark; and
responsive to the bookmark activation request:
retrieving the bookmark and the multiple user messages from the data store;
retrieving the identifier of the first version of the automated agent from the bookmark;
determining that a second, subsequent version of the automated agent is available; and
resuming the dialog between the user and the automated agent starting at the particular juncture using the first version of the automated agent to resume the dialog instead of the second, subsequent version, the dialog being resumed based on reconsideration of the multiple user messages by the automated agent such that the automated agent provides a second response to the multiple user messages, different from the first response.

7. The method of claim 6, wherein sending the multiple user messages to the automated agent at the second time causes the automated agent to repeat corresponding agent responses originally provided by the automated agent at the first time.

8. The method of claim 6, further comprising:
at the first time:
displaying a user interface presentation having multiple graphical control features, including a bookmark creation graphical control feature; and
receiving the bookmark creation request via activation of the bookmark creation graphical control feature displayed on the user interface presentation.

9. The method of claim 6, further comprising:
at the second time:
displaying a user interface presentation having multiple graphical control features, including a show bookmark graphical control feature;
responsive to selection of the show bookmark graphical control feature, presenting a bookmark list including the bookmark and one or more other bookmarks on the user interface presentation; and
receive the bookmark activation request via selection of the bookmark from the bookmark list.

10. The method of claim 6, further comprising:
receiving the bookmark creation request from the user via an input device.

11. A client device comprising:
one or more processing devices; and
a storage device storing computer-executable instructions which, when executed by the one or more processing devices, cause the one or more processing devices to:
at a first time:
provide a local messaging application by which a user can interact with an automated agent through an exchange of electronic messages over a computer network, the exchange of electronic messages forming a dialog;

store multiple bookmarks identifying different junctures within the dialog;
identify a first version of the automated agent that conducts the dialog; and
store an identifier of the first version of the automated agent in the multiple bookmarks;
at a second, subsequent time:
receive a selection which specifies a particular bookmark to activate, the particular bookmark being associated with a particular juncture within the dialog;
retrieve the identifier of the first version of the automated agent from the particular bookmark;
determine that a second, subsequent version of the automated agent is available; and
in response to the selection, resume the dialog with the automated agent at the particular juncture using the first version of the automated agent instead of the second, subsequent version, the dialog resumed based on reconsideration of multiple user messages submitted by the user prior to the particular juncture in the dialog over the computer network from the client device to the automated agent, such that a second response provided by the automated agent based on reconsideration of the multiple user messages at the second time differs from a first response provided by the automated agent based on initial consideration of the multiple user messages at the first time.

12. The client device of claim 11, wherein the computer-executable instructions, when executed by the one or more processing devices, cause the one or more processing devices to:
at the first time, store the multiple bookmarks responsive to user input.

13. The client device of claim 11, wherein the computer-executable instructions, when executed by the one or more processing devices, cause the one or more processing devices to:
at the second, subsequent time:
present the particular bookmark as text that includes one or more first user responses provided to the automated agent at the first time;
receive an edit input to replace the one or more of the first user responses with one or more second user responses; and
resume the dialog based at least the one or more second user responses.

14. The client device of claim 11, wherein the computer-executable instructions, when executed by the one or more processing devices, cause the one or more processing devices to:
receive a sharing selection requesting to share the particular bookmark with a recipient; and
in response to the sharing selection, send the particular bookmark to the recipient,
wherein the particular bookmark enables the recipient to resume the dialog at the particular juncture with the automated agent.

15. The client device of claim 11, wherein the computer-executable instructions, when executed by the one or more processing devices, cause the one or more processing devices to:
display a user interface presentation on the client device;
receive multiple different bookmark creation requests for different dialogs with different automated agents via the displayed user interface presentation;
create the multiple bookmarks and other bookmarks responsive to the multiple different bookmark creation requests, each bookmark specifying a respective juncture in a respective dialog with a respective automated agent;
receive multiple bookmark activation requests via the displayed user interface presentation; and
responsive to the multiple bookmark activation requests, send different sequences of user messages over the computer network to the different automated agents, each sequence of user messages corresponding to a specific juncture in a specific dialog with a specific automated agent.

16. The client device of claim 15, wherein the computer-executable instructions, when executed by the one or more processing devices, cause the one or more processing devices to:
display, on the user interface presentation, a first graphical control feature for entering the multiple different bookmark creation requests and a second graphical control feature for showing previously-created bookmarks.

17. The client device of claim 16, wherein the computer-executable instructions, when executed by the one or more processing devices, cause the one or more processing devices to:
responsive to activation of the second graphical control feature, display a list of at least two different bookmarks designating at least two different junctures in at least two different conversations with at least two different automated agents.

18. The client device of claim 11, wherein the computer-executable instructions, when executed by the one or more processing devices, cause the one or more processing devices to:
upon resumption of the dialog with the automated agent at the second, subsequent time, display multiple agent responses that were originally provided by the automated agent at the first time.

19. The client device of claim 11, wherein the computer-executable instructions, when executed by the one or more processing devices, cause the one or more processing devices to:
at the first time, automatically provide names for respective bookmarks based at least on keywords associated with individual messages that immediately precede respective junctures identified by the respective bookmarks.

* * * * *